(12) United States Patent
Huh et al.

(10) Patent No.: US 11,796,760 B2
(45) Date of Patent: Oct. 24, 2023

(54) OPTICAL IMAGING SYSTEM

(71) Applicant: Samsung Electro-Mechanics Co., Ltd., Suwon-si (KR)

(72) Inventors: Jae Hyuk Huh, Suwon-si (KR); Byung Hyun Kim, Suwon-si (KR); So Mi Yang, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 304 days.

(21) Appl. No.: 16/997,045

(22) Filed: Aug. 19, 2020

(65) Prior Publication Data

US 2021/0349289 A1    Nov. 11, 2021

(30) Foreign Application Priority Data

May 6, 2020    (KR) .......................... 10-2020-0053742

(51) Int. Cl.
*G02B 9/60*         (2006.01)
*G02B 13/00*        (2006.01)

(52) U.S. Cl.
CPC ........... *G02B 9/60* (2013.01); *G02B 13/0045* (2013.01); *G02B 13/0065* (2013.01)

(58) Field of Classification Search
None
See application file for complete search history.

(56) References Cited

U.S. PATENT DOCUMENTS

| 9,329,364 B2 | 5/2016 | Ahn et al. |
| 10,545,315 B2 | 1/2020 | Chen et al. |
| 10,852,511 B2 | 12/2020 | Lee et al. |
| 2012/0188655 A1 | 7/2012 | Tsai et al. |
| 2014/0320982 A1 | 10/2014 | Chen et al. |

(Continued)

FOREIGN PATENT DOCUMENTS

| CN | 101876743 A | 11/2010 |
| CN | 101957492 A | 1/2011 |

(Continued)

OTHER PUBLICATIONS

Korean Office Action dated Aug. 20, 2021 in counterpart Korean Patent Application No. 10-2020-0053742 (7 pages in English and 6 pages in Korean).

(Continued)

*Primary Examiner* — Darryl J Collins
(74) *Attorney, Agent, or Firm* — NSIP Law

(57) ABSTRACT

An optical imaging system includes a first lens, a second lens, a third lens having positive refractive power, a fourth lens, and a fifth lens disposed from an object side. In the optical imaging system, $0.2<(D23+D34+D45)/BFL<0.95$ and $0.8<TTL/f<0.95$, where D23 is a distance from an image-side surface of the second lens to an object-side surface of the third lens, D34 is a distance from an image-side surface of the third lens to an object-side surface of the fourth lens, D45 is a distance from an image-side surface of the fourth lens to an object-side surface of the fifth lens, BFL is a distance from an image-side surface of the fifth lens to an imaging plane, TTL is a distance from an object-side surface of the first lens to the imaging plane, and f is a focal length of the optical imaging system.

17 Claims, 11 Drawing Sheets

(56) References Cited

U.S. PATENT DOCUMENTS

| | | | |
|---|---|---|---|
| 2015/0116569 A1* | 4/2015 | Mercado | G02B 9/60 348/335 |
| 2018/0143402 A1 | 5/2018 | Lin et al. | |
| 2018/0284394 A1 | 10/2018 | Chen et al. | |
| 2018/0321470 A1 | 11/2018 | Lee et al. | |
| 2018/0335610 A1 | 11/2018 | Chen et al. | |
| 2018/0364455 A1 | 12/2018 | Chen et al. | |
| 2019/0285836 A1 | 9/2019 | Chang et al. | |
| 2019/0317305 A1 | 10/2019 | Wu et al. | |
| 2019/0324233 A1 | 10/2019 | Chen | |
| 2020/0110248 A1 | 4/2020 | Chen et al. | |
| 2020/0285025 A1 | 9/2020 | Jhang et al. | |
| 2020/0393656 A1* | 12/2020 | Huang | G02B 13/0045 |
| 2021/0141195 A1* | 5/2021 | Hu | G02B 13/0045 |

FOREIGN PATENT DOCUMENTS

| | | |
|---|---|---|
| CN | 102608731 A | 7/2012 |
| CN | 108663777 A | 10/2018 |
| CN | 208588854 U | 3/2019 |
| CN | 110174746 A | 8/2019 |
| CN | 110320647 A | 10/2019 |
| JP | 2012-211934 A | 11/2012 |
| KR | 10-2017-0141178 A | 12/2017 |
| KR | 10-2018-0122915 A | 11/2018 |
| KR | 10-2019-0088715 A | 7/2019 |
| TW | I615627 B | 2/2018 |
| TW | I626487 B | 6/2018 |
| TW | I640809 B | 11/2018 |

OTHER PUBLICATIONS

Taiwanese Office Action dated Aug. 27, 2021 issued in counterpart Taiwanese Patent Application No. 109129273 (7 pages in English and 7 pages in Taiwanese).

Chinese Office Action dated Jun. 1, 2022, in counterpart Chinese Patent Application No. 202011238299.6 (7 pages in English and 8 pages in Chinese).

Korean Office Action dated May 10, 2022, in counterpart Korean Patent Application No. 10-2022-0025210 (7 pages in English and 6 pages in Korean).

Notice of Decision for Rejection dated Oct. 27, 2021, in counterpart Korean Patent Application No. 10-2020-0053742 (5 pages in English and 4 pages in Korean).

Taiwanese Office Action dated Jun. 30, 2022, in counterpart Taiwanese Patent Application No. 111112922 (6 pages in English and 5 pages in Mandarin).

Chinese Office Action dated Nov. 24, 2022, in counterpart Chinese Patent Application No. 202011238299.6 (8 pages in English, 9 pages in Chinese).

* cited by examiner

OPTICAL IMAGING SYSTEM

CROSS-REFERENCE TO RELATED APPLICATION(S)

This application claims the benefit under 35 USC 119(a) of Korean Patent Application No. 10-2020-0053742 filed on May 6, 2020 in the Korean Intellectual Property Office, the entire disclosure of which is incorporated herein by reference for all purposes.

BACKGROUND

1. Field

This application relates to an optical imaging system configured to fold an optical path.

2. Description of Related Art

A small-sized camera may be mounted in a wireless terminal device. For example, small-sized cameras may be mounted on a front surface and a rear surface of a wireless terminal device, respectively. Since small-sized cameras are used for various purposes such as outdoor scenery pictures, indoor portrait pictures, and the like, they are required to have performance comparable to that of ordinary cameras. However, it may be difficult for a small-sized camera to implement high performance because a mounting space of the small-sized camera is restricted by a size of a wireless terminal device. Accordingly, there is a need for development of an optical imaging system which may improve performance of a small-sized camera without increasing a size of the small-sized camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An optical imaging system which may be mounted in a thinned small-sized terminal device while having a large focal length.

In one general aspect, an optical imaging system includes a first lens, a second lens, a third lens having positive refractive power, a fourth lens, and a fifth lens disposed in order from an object side. In the optical imaging system, $0.2<(D23+D34+D45)/BFL<0.95$ and $0.8<TTL/f<0.95$, where D23 is a distance from an image-side surface of the second lens to an object-side surface of the third lens, D34 is a distance from an image-side surface of the third lens to an object-side surface of the fourth lens, D45 is a distance from an image-side surface of the fourth lens to an object-side surface of the fifth lens, BFL is a distance from an image-side surface of the fifth lens to an imaging plane, TTL is a distance from an object-side surface of the first lens to the imaging plane, and f is a focal length of the optical imaging system.

The second lens may have negative refractive power.

A sum of a refractive index of the second lens and a refractive index of the third lens may be greater than 3.20.

An absolute value of a sum of a focal length of the first lens and a focal length of the second lens may be less than 2.0.

The optical imaging system may satisfy $|f/f1+f/f2|<1.2$, where f1 is a focal length of the first lens and f2 is a focal length of the second lens.

The optical imaging system may satisfy $0 \leq D12/f \leq 0.07$, where D12 is a distance from an image-side surface of the first lens to an object-side surface of the second lens.

The optical imaging system may satisfy $0.62 \leq EL1S1/ImgHT \leq 0.94$, where EL1S1 is an effective radius of the object-side surface of the first lens and ImgHT is a height of the imaging plane.

The optical imaging system may satisfy $0.8 \leq EL1S2/EL1S1 \leq 1.01$, where EL1S1 is an effective radius of the object-side surface of the first lens and EL1S2 is an effective radius of an image-side surface of the first lens.

The optical imaging system may satisfy $3.5 \leq TTL/ImgHT$, where ImgHT is a height of the imaging plane.

The optical imaging system may satisfy $R1/f \leq 0.265$, where R1 is a radius of curvature of the object-side surface of the first lens.

An optical imaging system includes a first lens having refractive power, a second lens having refractive power, a third lens having refractive power, a fourth lens having refractive power, and a fifth lens having positive refractive power. In the optical imaging system, a thickness T1 in a center of an optical axis of the first lens and a distance TTL from an object-side surface of the first lens to an imaging plane satisfy $0.08<T1/TTL<0.18$.

An image-side surface of the third lens may be concave.
An object-side surface of the fourth lens may be convex.
An image-side surface of the fourth lens may be concave.
An object-side surface of the fifth lens may be convex.

The optical imaging system may satisfy $2.4<(V2+V4)/V3$, where V2 is an Abbe number of the second lens, V3 is an Abbe number of the third lens, and V4 is an Abbe number of the fourth lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
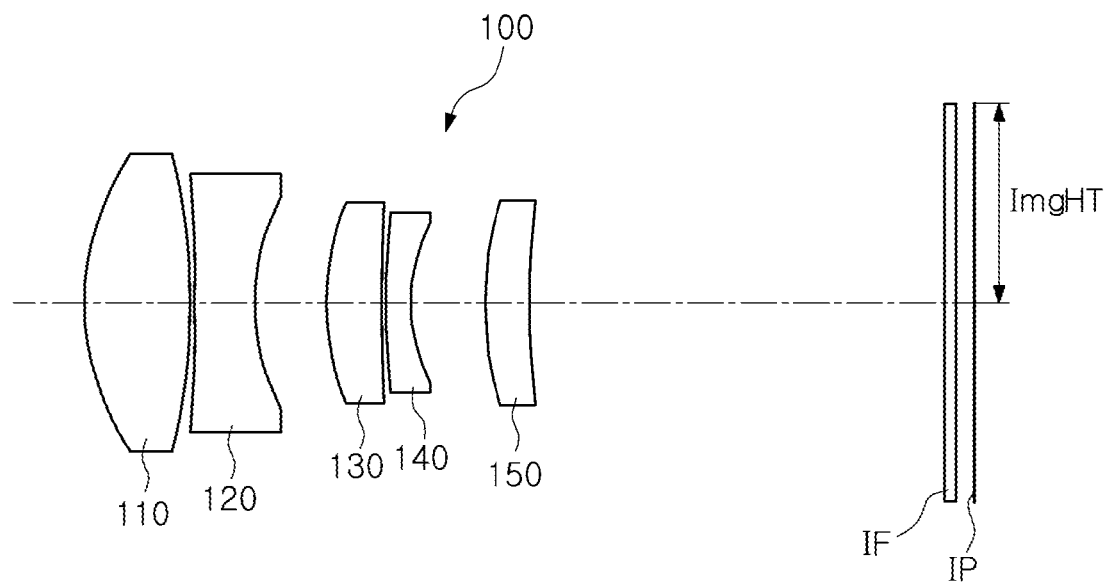
FIG. 1 illustrates a configuration of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the examples, a first lens refers to a lens most adjacent to an object (or a subject), and a fifth lens refers to a lens most adjacent to an imaging plane (or an image sensor). In the example embodiments, units of a radius of curvature, a thickness, a TTL, an Img_HT (a height of an imaging plane: half of a diagonal length of an imaging plane), and a focal length are indicated in millimeters (mm). A thickness of a lens, a gap between lenses, and a TTL refer to a distance of a lens in an optical axis. Also, in the descriptions of a shape of a lens, the configuration in which one surface is convex indicates that an optical axis region of the surface is convex, and the configuration in which one surface is concave indicates that an optical axis region of the surface is concave. Thus, even when it is described that one surface of a lens is convex, an edge of the lens may be concave. Similarly, even when it is described that one surface of a lens is concave, an edge of the lens may be convex.

The optical imaging system includes an optical system including a plurality of lenses. For example, the optical system of the optical imaging system may include a plurality of lenses having refractive power. However, the optical imaging system does not only include lenses having refractive power. For example, the optical imaging system may include a prism for refracting incident light and a stop for adjusting the amount of light. The optical imaging system may also include an infrared cut-off filter for blocking infrared rays. The optical imaging system may further include an image sensor (for example, an imaging device) configured to convert an image of a subject incident through the optical system into an electrical signal. The optical imaging system may further include a gap maintaining member for adjusting a distance between lenses.

The plurality of lenses may be formed of a material having a refractive index different from that of air. For example, the plurality of lenses may be formed of a plastic or glass material. At least one of the plurality of lenses may have an aspherical shape. An aspherical surface of the lens may be represented by equation 1 as below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad \text{Equation 1}$$

In equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface of the lens to an apex of the aspherical surface in an optical axis direction.

The optical imaging system may include five or more lenses. For example, the optical imaging system may include a first lens, a second lens, a third lens, a fourth lens, and a fifth lens disposed in order from an object side.

The first to fifth lenses may be disposed with a gap with respect to adjacent lenses. For example, a certain gap may be formed between an image-side surface of a lens and an object-side surface of an adjacent lens.

The first lens has a certain refractive power. For example, the first lens may have positive refractive power. One surface of the first lens is convex. For example, an object-side surface of the first lens may be convex. The first lens has a certain refractive index. For example, the first lens may have a refractive index less than 1.56. The first lens has a certain focal length. For example, the focal length of the first lens may be determined within a range of 4.0 to 8.0 mm.

The second lens has a certain refractive power. For example, the second lens may have negative refractive power. One surface of the second lens is concave. For example, an object-side surface or an image-side surface of the second lens may be concave. The second lens has a certain refractive index. For example, the refractive index of the second lens may be 1.6 or more to less than 1.8. The second lens has a certain focal length. For example, the focal length of the second lens may be determined within a range of −7.0 to −3.0 mm.

The third lens has a certain refractive power. For example, the third lens may have positive refractive power. One surface of the third lens is convex. For example, an object-side surface or an image-side surface of the third lens may be convex. The third lens has a certain refractive index. For example, the third lens may have a refractive index of 1.65 or more to less than 2.0. In addition, the refractive index of the third lens may be greater than the refractive index of the second lens. The third lens has a certain focal length. For example, the focal length of the third lens may be determined within a range of 4.6 to 20 mm.

The fourth lens has a certain refractive power. For example, the fourth lens may have positive or negative refractive power. One surface of the fourth lens has a concave shape. For example, an object-side surface or an image-side surface of the fourth lens may be concave. The fourth lens has a certain refractive index. For example, the fourth lens may have a refractive index of 1.6 or more to less than 1.8.

The fifth lens has a certain refractive power. For example, the fifth lens may have positive or negative refractive power. One surface of the fifth lens is concave. For example, an object-side surface or an image-side surface of the fifth lens may be concave. The fifth lens has a certain refractive index. For example, the fifth lens may have a refractive index of 1.5 or more to less than 1.6.

The optical imaging system includes a lens formed of plastic. For example, in the optical imaging system, at least one of the five or more lenses constituting a lens group may be formed of a plastic material. The optical imaging system includes an aspherical lens. For example, in the optical imaging system, at least one of the five or more lenses constituting a lens group may include an aspherical lens.

The optical imaging system may include a member configured to fold or refract an optical path. For example, the optical imaging system may include one or more prisms. The one or more prisms may be disposed on an object side of the first lens or an object-side surface of the first lens and an image side of the fifth lens. The one or more prisms may have a refractive index higher than the refractive index of the third lens. For example, the refractive index of the prism may be 1.7 or more.

The optical imaging system includes a filter, a stop, and image sensor. The filter is disposed between a lens, disposed to be closest to an imaging plane, and an image sensor. The filter blocks certain wavelengths from incident light to improve a resolution of the optical imaging system. For example, the filter may block an infrared wavelength of the incident light. An f number of the optical imaging system may be 2.6 or more.

The optical imaging system may satisfy one or more of conditional expressions below.

$3.2 < n2 + n3$ $|f1 + f2| < 2.0$ $|f/f1 + f/f2| < 1.2$ $0 \leq D12/f \leq 0.07$ $0.62 \leq EL1S1/\text{ImgHT} \leq 0.94$ $0.8 \leq EL1S2/EL1S1 \leq 1.01$ $0.8 \leq TTL/f \leq 0.95$ $3.5 \leq TTL/\text{ImgHT}$ $R1/f \leq 0.265$ $0.08 < T1/TTL < 0.18$ In the above conditional expressions, "n2" is the refractive index of the second lens, "n3" is the refractive index of the third lens, "f" is a focal length of the optical imaging system, "f1" is a focal length of the first lens, "f2" is a focal length of the second lens, "D12" is a distance from an image-side surface of the first lens to an object-side surface of the second lens, "EL1S1" is an effective radius of an object-side surface of the first lens, "EL1S2" is an effective radius of the image-side surface of the first lens, "TTL" is a distance from the object-side surface of the first lens to the imaging plane, "ImgHT" is a height of the imaging plane (half of a diagonal length of the imaging plane), "R1" is a radius of curvature of the object-side surface of the first lens, and "T1" is a thickness in a center of an optical axis of the first lens.

The optical imaging system may additionally satisfy at least one of conditional expressions below.

$$0.4 < BFL/f$$

$$0.4 < BFL/TTL$$

$$2.1 < BFL/ImgHT$$

$$2.1 < f/ImgHT$$

$$0.3 < (D23+D45)/BFL$$

$$0.15 < D23/BFL$$

$$0.15 < D45/BFL$$

$$0.2 < (D23+D34+D45)/BFL < 0.5$$

$$0.8 < (L1S1:L5S2)/BFL < 1.2$$

$$(n2+n4)/n3 < 2.0$$

$$2.4 < (V2+V4)/V3$$

In the above conditional expressions, "BFL" is a distance from an image-side surface of the fifth lens to the imaging plane, "D23" is a distance from an image-side surface of the second lens to an object-side surface of the third lens, "D34" is a distance from an image-side surface of the third lens to an object-side surface of the fourth lens, "D45" is a distance from an image-side surface of the fourth lens to an object-side surface of the fifth lens, "L1S1:L5S2" is a distance from the object-side surface of the first lens to the image-side surface of the fifth lens, "n4" is a refractive index of the fourth lens, "V2" is an Abbe number of the second lens, "V3" is an Abbe number of the third lens, and "V4" is an Abbe number of the fourth lens.

Hereinafter, optical imaging systems according to various examples will be described.

An optical imaging system according to a first example will be described with reference to FIG. 1.

The optical imaging system 100 may include a first lens 110, a second lens 120, a third lens 130, a fourth lens 140, and a fifth lens 150.

The first lens 110 has positive refractive power. In the first lens 110, an object-side surface is convex and an image-side surface is convex. The second lens 120 has negative refractive power. In the second lens 120, an object-side surface is concave and an image-side surface is concave. The third lens 130 has positive refractive power. In the third lens 130, an object-side surface is convex and an image-side surface is concave. The fourth lens 140 has negative refractive power. In the fourth lens 140, an object-side surface is convex and an image-side surface is concave. The fifth lens 150 has positive refractive power. In the fifth lens 150, an object-side surface is convex and an image-side surface is concave.

The optical imaging system 100 may include a filter IF and an image sensor IP. The filter IF may be disposed in front of the image sensor IP to block infrared rays, or the like, included in incident light. The image sensor IP may include a plurality of optical sensors. The above-configured image sensor IP may be configured to convert an optical signal into an electrical signal. The image sensor IP may form an imaging plane for imaging light incident through the first lens 110 to the fifth lens 150.

The optical imaging system 100 may include an optical path changing mechanism. For example, the optical imaging system 100 may include a prism reflecting or refracting incident light in a direction intersecting an optical path of the incident light.

Figure 2:
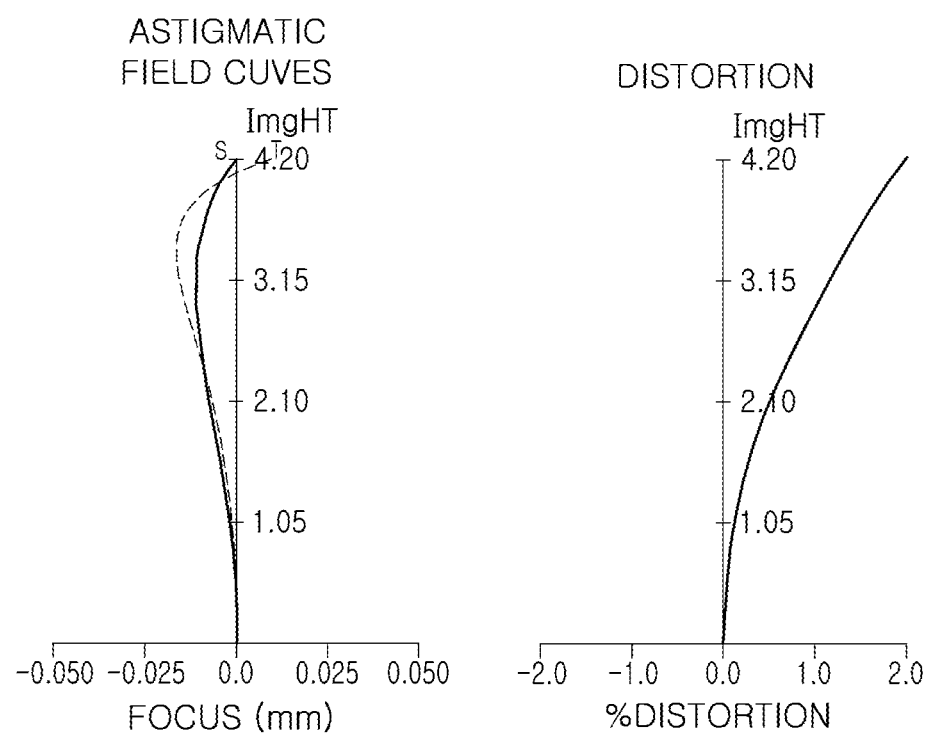
FIG. 2 is an aberration curve of the optical imaging system illustrated in FIG. 1.

Table 1 illustrates lens characteristics of the optical imaging system 100, and Table 2 illustrates a spherical values of the optical imaging system 100. FIG. 2 is an aberration curve of the above-configured optical imaging system 100.

TABLE 1

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 6.000 |
| S2 | | Infinity | 6.300 | 1.723 | 29.5 | 6.000 |
| S3 | | Infinity | 6.300 | 1.723 | 29.5 | 8.485 |
| S4 | | Infinity | 9.000 | | | 6.000 |
| S5 | First Lens | 4.98 | 2.121 | 1.534 | 55.7 | 2.965 |
| S6 | | −11.61 | 0.100 | | | 2.777 |
| S7 | Second | −62.32 | 1.232 | 1.615 | 26.0 | 2.614 |
| S8 | Lens | 4.14 | 1.442 | | | 2.137 |
| S9 | Third Lens | 4.85 | 1.109 | 1.671 | 19.2 | 1.997 |
| S10 | | 23.10 | 0.100 | | | 1.832 |
| S11 | Fourth | 14.73 | 0.500 | 1.615 | 26.0 | 1.783 |
| S12 | Lens | 3.27 | 1.505 | | | 1.590 |
| S13 | Fifth Lens | 6.12 | 0.899 | 1.544 | 56.1 | 2.030 |
| S14 | | 12.25 | 8.403 | | | 2.030 |
| S15 | Filter | Infinity | 0.210 | 1.519 | 64.2 | 4.074 |
| S16 | | Infinity | 0.379 | | | 4.107 |
| S17 | Imaging Plane | Infinity | 0.000 | | | 4.202 |

TABLE 2

| Aspherical Constant | S5 | S6 | S7 | S8 | S9 |
|---|---|---|---|---|---|
| K | −0.66498 | −2.29482 | 23.17055 | 0.05990 | 0.06127 |
| A | 0.00029 | 0.00075 | −0.00145 | −0.00327 | −0.00276 |
| B | 0.00000 | −0.00002 | 0.00012 | 0.00002 | 0.00020 |
| C | 0.00000 | 0.00000 | 0.00000 | −0.00001 | −0.00001 |
| D | 0.00000 | 0.00000 | 0.00000 | 0.00000 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

| Aspherical Constant | S10 | S11 | S12 | S13 | S14 |
|---|---|---|---|---|---|
| K | −2.70287 | 3.07508 | −0.07208 | −1.03685 | −8.43430 |
| A | −0.00298 | −0.00267 | −0.00583 | −0.00551 | −0.00366 |
| B | 0.00031 | −0.00005 | 0.00036 | 0.00025 | 0.00000 |
| C | −0.00002 | 0.00004 | 0.00011 | 0.00008 | 0.00003 |
| D | 0.00000 | −0.00001 | 0.00002 | 0.00001 | 0.00001 |
| E | 0.00000 | 0.00000 | −0.00001 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Figure 3:
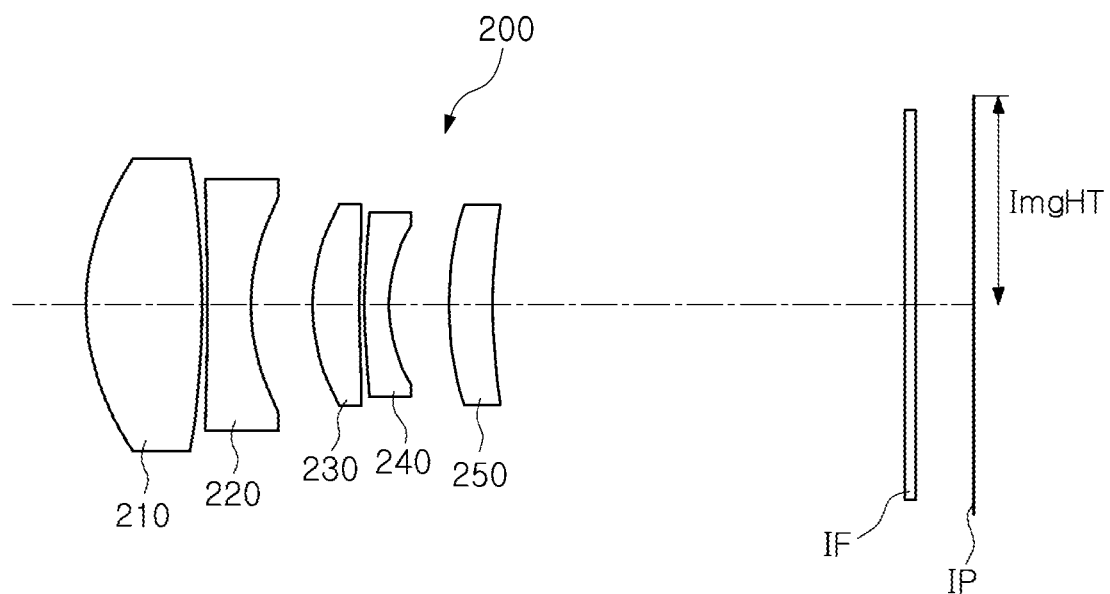
FIG. 3 illustrates a configuration of an optical imaging system according to a second example.

Hereinafter, an optical imaging system according to a second example will be described with reference to FIG. 3.

The optical imaging system 200 may include a first lens 210, a second lens 220, a third lens 230, a fourth lens 240, and a fifth lens 250.

The first lens 210 has positive refractive power. In the first lens 210, an object-side surface is convex and an image-side surface is convex. The second lens 220 has negative refractive power. In the second lens 220, an object-side surface is concave and an image-side surface is concave. The third lens 230 has positive refractive power. In the third lens 230, an object-side surface is convex and an image-side surface is concave. The fourth lens 240 has negative refractive power. In the fourth lens 240, an object-side surface is convex and an image-side surface is concave. The fifth lens 250 has positive refractive power. In the fifth lens 250, an object-side surface is convex and an image-side surface is concave.

The optical imaging system 200 may include a filter IF, an image sensor IP. The filter IF may be disposed in front of the image sensor IP to block infrared rays, or the like, included in incident light. The image sensor IP may include a plurality of optical sensors. The above-configured image sensor IP may be configured to convert an optical signal into an electrical signal. The image sensor IP may form an imaging plane for imaging light incident through the first lens 210 to the fifth lens 250.

The optical imaging system 200 may include an optical path changing mechanism. For example, the optical imaging system 200 may include a prism reflecting or refracting incident light in a direction intersecting an optical path of the incident light.

Figure 4:
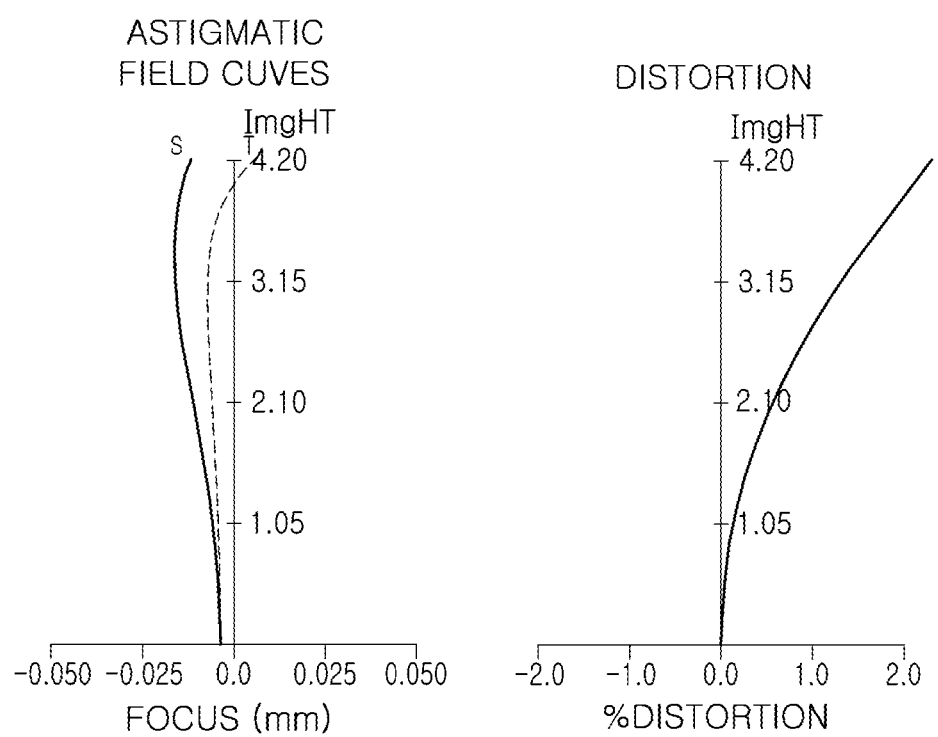
FIG. 4 is an aberration curve of the optical imaging system illustrated in FIG. 3.

Table 3 illustrates lens characteristics of the optical imaging system 200, and Table 4 illustrates a spherical values of the optical imaging system 200. FIG. 4 is an aberration curve of the above-configured optical imaging system 200.

TABLE 3

| Surface No. | Remark | Radius of Curvature | Thickness/ Distance | Refractive Index | Abbe Number | Effective Radius |
|---|---|---|---|---|---|---|
| S1 | Prism | Infinity | 6.000 | | | 5.757 |
| S2 | | Infinity | 6.000 | 1.723 | 29.5 | 5.500 |
| S3 | | Infinity | 4.000 | 1.723 | 29.5 | 8.000 |
| S4 | | Infinity | 2.350 | | | 5.500 |
| S5 | First Lens | 4.96 | 2.341 | 1.534 | 55.7 | 2.965 |
| S6 | | −15.58 | 0.100 | | | 2.677 |
| S7 | Second | −94.88 | 0.888 | 1.639 | 23.5 | 2.555 |
| S8 | Lens | 4.14 | 1.242 | | | 2.180 |
| S9 | Third Lens | 3.95 | 0.961 | 1.671 | 19.2 | 2.057 |
| S10 | | 33.13 | 0.100 | | | 1.945 |
| S11 | Fourth | 13.70 | 0.500 | 1.639 | 23.5 | 1.873 |
| S12 | Lens | 3.01 | 1.228 | | | 1.635 |
| S13 | Fifth Lens | 6.25 | 0.899 | 1.544 | 56.1 | 2.030 |
| S14 | | 10.61 | 8.353 | | | 2.030 |
| S15 | Filter | Infinity | 0.210 | 1.519 | 64.2 | 3.904 |
| S16 | | Infinity | 1.174 | | | 3.935 |
| S17 | Imaging Plane | Infinity | 0.004 | | | 4.212 |

TABLE 4

| Aspherical Constant | S5 | S6 | S7 | S8 | S9 |
|---|---|---|---|---|---|
| K | −0.65434 | −1.10165 | −99.00000 | 0.04811 | 0.03444 |
| A | 0.00030 | 0.00071 | −0.00144 | −0.00332 | −0.00286 |
| B | 0.00000 | −0.00002 | 0.00012 | 0.00001 | 0.00019 |
| C | 0.00000 | 0.00000 | 0.00000 | −0.00001 | −0.00001 |
| D | 0.00000 | 0.00000 | 0.00000 | 0.00000 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

TABLE 4-continued

| Aspherical Constant | S10 | S11 | S12 | S13 | S14 |
|---|---|---|---|---|---|
| K | 71.93392 | −0.24152 | −0.04750 | −1.13402 | −7.13739 |
| A | −0.00288 | −0.00277 | −0.00558 | −0.00556 | −0.00358 |
| B | 0.00032 | −0.00006 | 0.00034 | 0.00030 | −0.00001 |
| C | −0.00002 | 0.00004 | 0.00010 | 0.00009 | 0.00004 |
| D | 0.00000 | −0.00001 | 0.00002 | 0.00001 | 0.00001 |
| E | 0.00000 | 0.00000 | −0.00001 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Figure 5:
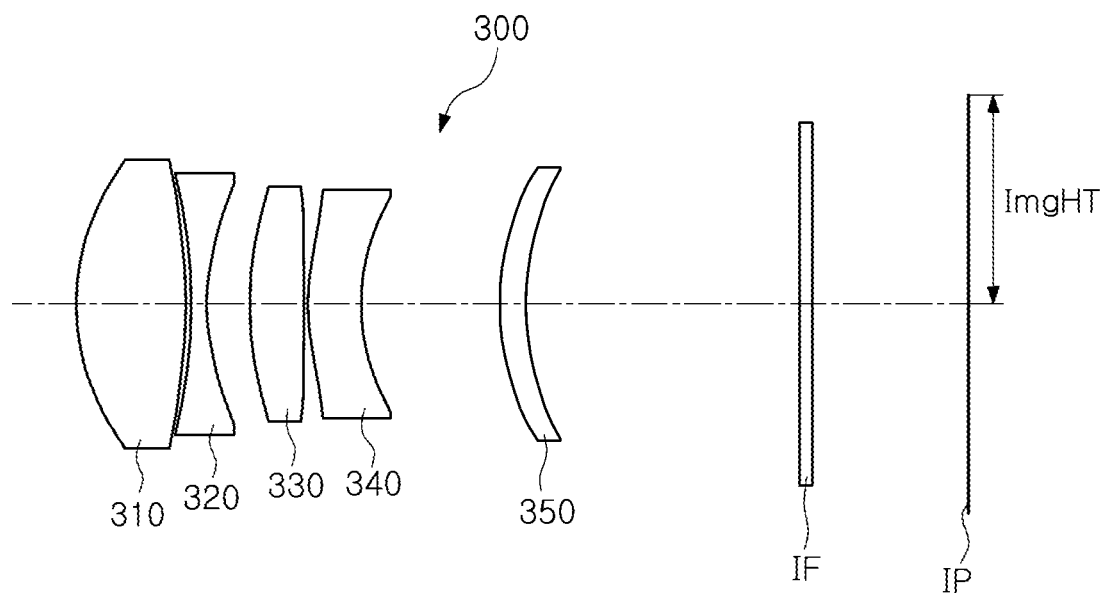
FIG. 5 illustrates a configuration of an optical imaging system according to a third example.

Hereinafter, an optical imaging system according to a third example will be described with reference to FIG. 5.

The optical imaging system 300 may include a first lens 310, a second lens 320, a third lens 330, a fourth lens 340, and a fifth lens 350.

The first lens 310 has positive refractive power. In the first lens 310, an object-side surface is convex and an image-side surface is convex. The second lens 320 has negative refractive power. In the second lens 320, an object-side surface is concave and an image-side surface is concave. The third lens 330 has positive refractive power. In the third lens 330, an object-side surface convex and an image-side surface is concave. The fourth lens 340 has negative refractive power. In the fourth lens 340, an object-side surface is convex and an image-side surface is concave. The fifth lens 350 has positive refractive power. In the fifth lens 350, an object-side surface is convex and an image-side surface is concave.

The optical imaging system 300 may include a filter IF and an image sensor IP. The filter IF may be disposed in front of the image sensor IP to block infrared rays included in incident light. The image sensor IP may include a plurality of optical sensors. The above-configured image sensor IP may be configured to convert an optical signal into an electrical signal. The image sensor IP may form an imaging plane for imaging light incident through the first lens 310 to the fifth lens 350.

The optical imaging system 300 may include an optical path changing mechanism. For example, the optical imaging system 300 may include a prism reflecting or refracting incident light in a direction intersecting an optical path of the incident light.

Figure 6:
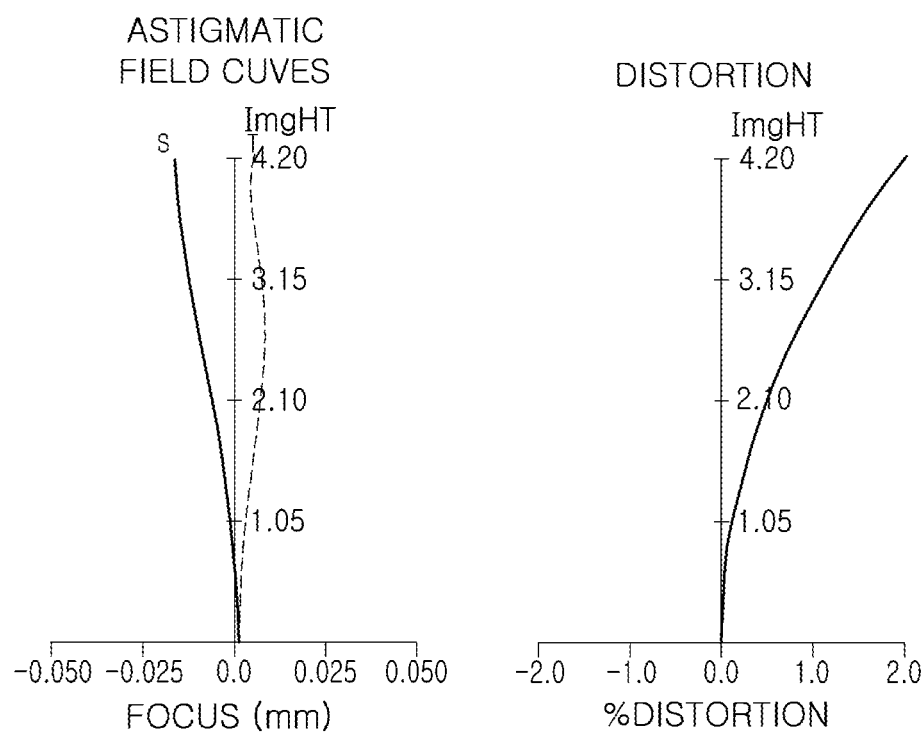
FIG. 6 is an aberration curve of the optical imaging system illustrated in FIG. 5.

Table 5 illustrates lens characteristics of the optical imaging system 300, and Table 6 illustrates aspherical values of the optical imaging system 300. FIG. 6 is an aberration curve of the above-configured optical imaging system 300.

TABLE 5

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 5.396 |
| S2 | | Infinity | 5.500 | 1.723 | 29.5 | 5.000 |
| S3 | | Infinity | 5.500 | 1.723 | 29.5 | 7.000 |
| S4 | | Infinity | 3.000 | | | 5.000 |
| S5 | First Lens | 4.61 | 2.218 | 1.534 | 55.7 | 2.900 |
| S6 | | −10.08 | 0.113 | | | 2.668 |
| S7 | Second | −9.30 | 0.300 | 1.615 | 26.0 | 2.633 |
| S8 | Lens | 4.79 | 0.890 | | | 2.397 |
| S9 | Third Lens | 7.54 | 1.067 | 1.671 | 19.2 | 2.359 |
| S10 | | 74.15 | 0.100 | | | 2.348 |
| S11 | Fourth | 5.45 | 1.071 | 1.615 | 26.0 | 2.299 |
| S12 | Lens | 3.82 | 2.815 | | | 2.163 |
| S13 | Fifth Lens | 4.62 | 0.506 | 1.534 | 55.7 | 2.754 |
| S14 | | 4.65 | 5.563 | | | 2.696 |

TABLE 5-continued

| Surface No. | Remark | Radius of Curvature | Thickness/ Distance | Refractive Index | Abbe Number | Effective Radius |
|---|---|---|---|---|---|---|
| S15 | Filter | Infinity | 0.210 | 1.519 | 64.2 | 3.592 |
| S16 | | Infinity | 3.148 | | | 3.617 |
| S17 | Imaging Plane | Infinity | −0.001 | | | 4.202 |

TABLE 6

| Aspherical Constant | S5 | S6 | S7 | S8 | S9 |
|---|---|---|---|---|---|
| K | −0.62152 | 0.00000 | 0.00000 | 0.00000 | 0.00000 |
| A | 0.00029 | 0.00193 | 0.00094 | −0.00303 | −0.00022 |
| B | 0.00002 | 0.00002 | 0.00010 | 0.00002 | −0.00001 |
| C | 0.00000 | −0.00002 | −0.00003 | 0.00000 | −0.00002 |
| D | 0.00000 | 0.00000 | 0.00000 | 0.00000 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

| Aspherical Constant | S10 | S11 | S12 | S13 | S14 |
|---|---|---|---|---|---|
| K | 0.00000 | 0.00000 | 0.00000 | 0.00000 | 0.00000 |
| A | −0.00252 | −0.00654 | −0.00401 | −0.00697 | −0.00713 |
| B | 0.00002 | −0.00030 | −0.00023 | 0.00029 | 0.00029 |
| C | −0.00003 | 0.00004 | 0.00010 | 0.00006 | 0.00004 |
| D | 0.00000 | 0.00000 | −0.00001 | 0.00000 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Figure 7:
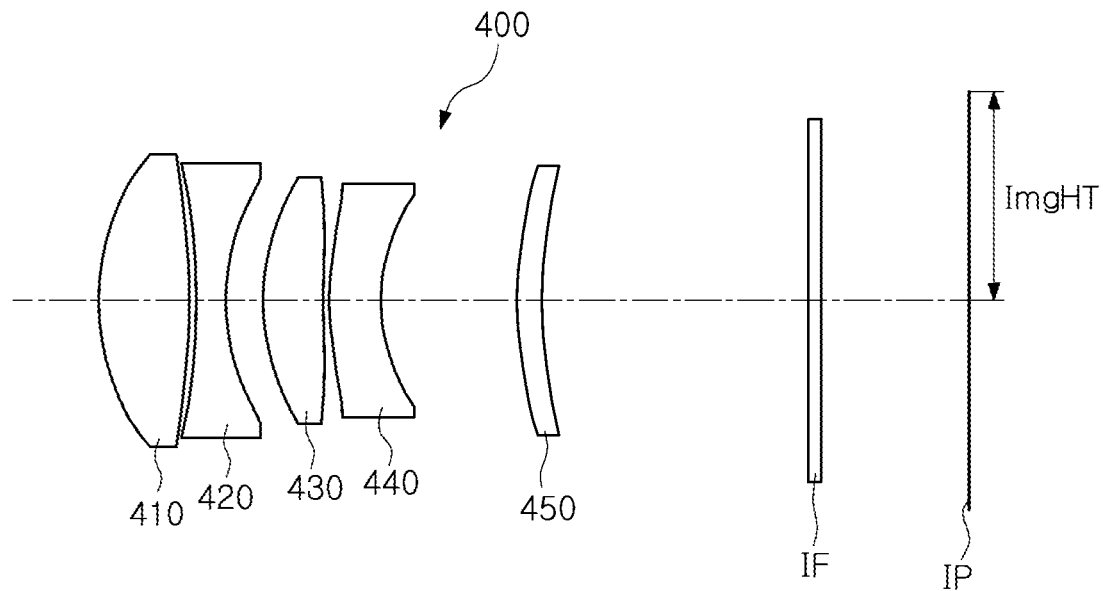
FIG. 7 illustrates a configuration of an optical imaging system according to a fourth example.

Hereinafter, an optical imaging system according to the fourth example will be described with reference to FIG. 7.

The optical imaging system 400 includes a first lens 410, a second lens 420, a third lens 430, a fourth lens 440, and a fifth lens 450.

The first lens 410 has positive refractive power. In the first lens 410, an object-side surface is convex and an image-side surface is convex. The second lens 420 has negative refractive power. In the second lens 420, an object-side surface is concave and an image-side surface is concave. The third lens 430 has positive refractive power. In the third lens 430, an object-side surface is convex and an image-side surface is concave. The fourth lens 440 has negative refractive power. In the fourth lens 440, an object-side surface is convex and an image-side surface is concave. The fifth lens 450 has negative refractive power. In the fifth lens 450, an object-side surface is convex and an image-side surface is concave.

The optical imaging system 400 includes a filter IF and an image sensor IP. The filter IF may be disposed in front of the image sensor IP to block infrared rays included in the incident light. The image sensor IP may include a plurality of optical sensors. The above-configured image sensor IP is configured to convert an optical signal into an electrical signal. The image sensor IP may form an imaging plane for imaging light incident through the first lens 410 to the fifth lens 450.

The optical imaging system 400 may include an optical path changing mechanism. For example, the optical imaging system 400 may include a prism reflecting or refracting incident light in a direction intersecting an optical path of the incident light.

Figure 8:
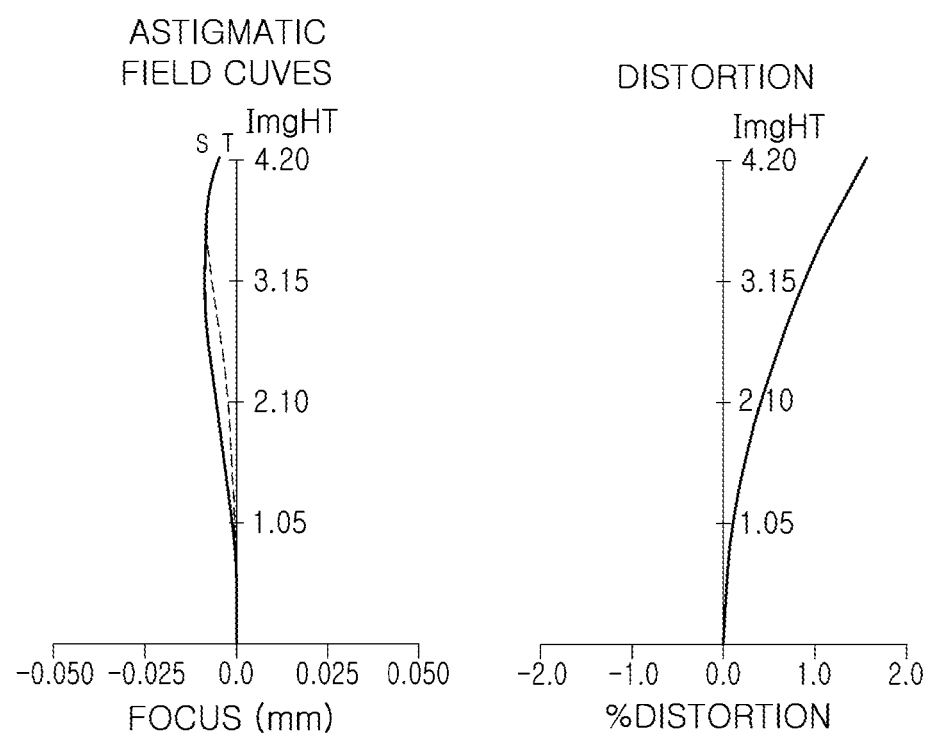
FIG. 8 is an aberration curve of the optical imaging system illustrated in FIG. 7.

Table 7 illustrates lens characteristics of the optical imaging system 400, and Table 8 illustrates aspherical values of the optical imaging system 400. FIG. 8 is an aberration curve of the above-configured optical imaging system 400.

TABLE 7

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 5.057 |
| S2 | | Infinity | 5.500 | 1.723 | 29.5 | 5.000 |
| S3 | | Infinity | 5.500 | 1.723 | 29.5 | 7.000 |
| S4 | | Infinity | 3.000 | | | 5.000 |
| S5 | First | 4.69 | 1.866 | 1.534 | 55.7 | 3.000 |
| S6 | Lens | −12.80 | 0.160 | | | 2.860 |
| S7 | | −10.74 | 0.584 | 1.635 | 24.0 | 2.813 |
| S8 | Second Lens | 4.17 | 0.786 | | | 2.503 |
| S9 | Third | 4.69 | 1.247 | 1.671 | 19.2 | 2.529 |
| S10 | Lens | 45.18 | 0.123 | | | 2.493 |
| S11 | Fourth | 5.73 | 1.072 | 1.671 | 19.2 | 2.392 |
| S12 | Lens | 3.45 | 2.838 | | | 2.164 |
| S13 | Fifth | 6.49 | 0.500 | 1.534 | 55.7 | 2.754 |
| S14 | Lens | 6.79 | 5.563 | | | 2.756 |
| S15 | Filter | Infinity | 0.210 | 1.519 | 64.2 | 3.651 |
| S16 | | Infinity | 3.051 | | | 3.675 |
| S17 | Imaging Plane | Infinity | 0.000 | | | 4.202 |

TABLE 8

| Aspherical Constant | S5 | S6 | S7 | S8 | S9 |
|---|---|---|---|---|---|
| K | −0.59765 | 0.00000 | 0.00000 | 0.00000 | 0.00000 |
| A | 0.00027 | 0.00190 | 0.00111 | −0.00296 | 0.00022 |
| B | 0.00002 | 0.00003 | 0.00009 | 0.00003 | −0.00001 |
| C | 0.00000 | −0.00002 | −0.00003 | −0.00001 | −0.00002 |
| D | 0.00000 | 0.00000 | 0.00000 | 0.00000 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

| Aspherical Constant | S10 | S11 | S12 | S13 | S14 |
|---|---|---|---|---|---|
| K | 0.00000 | 0.00000 | 0.00000 | 0.00000 | 0.00000 |
| A | −0.00271 | −0.00688 | −0.00323 | −0.00777 | −0.00805 |
| B | −0.00001 | −0.00033 | −0.00019 | 0.00037 | 0.00037 |
| C | −0.00002 | 0.00005 | 0.00010 | 0.00005 | 0.00003 |
| D | 0.00000 | 0.00000 | −0.00001 | 0.00000 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Figure 9:
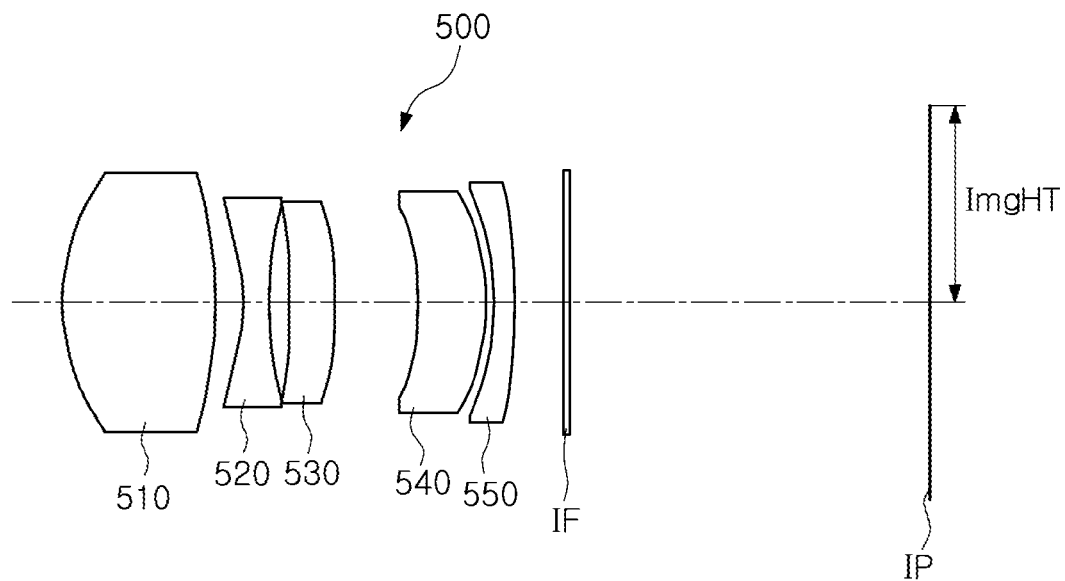
FIG. 9 illustrates a configuration of an optical imaging system according to a fifth example.

Hereinafter, an optical imaging system according to the fifth example will be described with reference to FIG. 9.

The optical imaging system 500 includes a first lens 510, a second lens 520, a third lens 530, a fourth lens 540, and a fifth lens 550.

The first lens 510 has positive refractive power. In the first lens 510, an object-side surface is convex and an image-side surface is convex. The second lens 520 has negative refractive power. In the second lens 520, an object-side surface is concave and an image-side surface is concave. The third lens 530 has positive refractive power. In the third lens 530, an object-side surface is convex and an image-side surface is convex. The fourth lens 540 has positive refractive power. In the fourth lens 540, an object-side surface is concave and an image-side surface is convex. The fifth lens 550 has negative refractive power. In the fifth lens 550, an object-side surface is concave and an image-side surface is convex.

The optical imaging system 500 includes a filter IF and an image sensor IP. The filter IF may be disposed in front of the image sensor IP to block infrared rays included in the incident light. The image sensor IP may include a plurality of optical sensors. The above-configured image sensor IP is configured to convert an optical signal into an electrical signal. The image sensor IP may form an imaging plane for imaging light incident through the first lens 510 to the fifth lens 550.

The optical imaging system 500 may include an optical path changing mechanism. For example, the optical imaging system 500 may include a prism reflecting or refracting incident light in a direction intersecting an optical path of the incident light.

Figure 10:
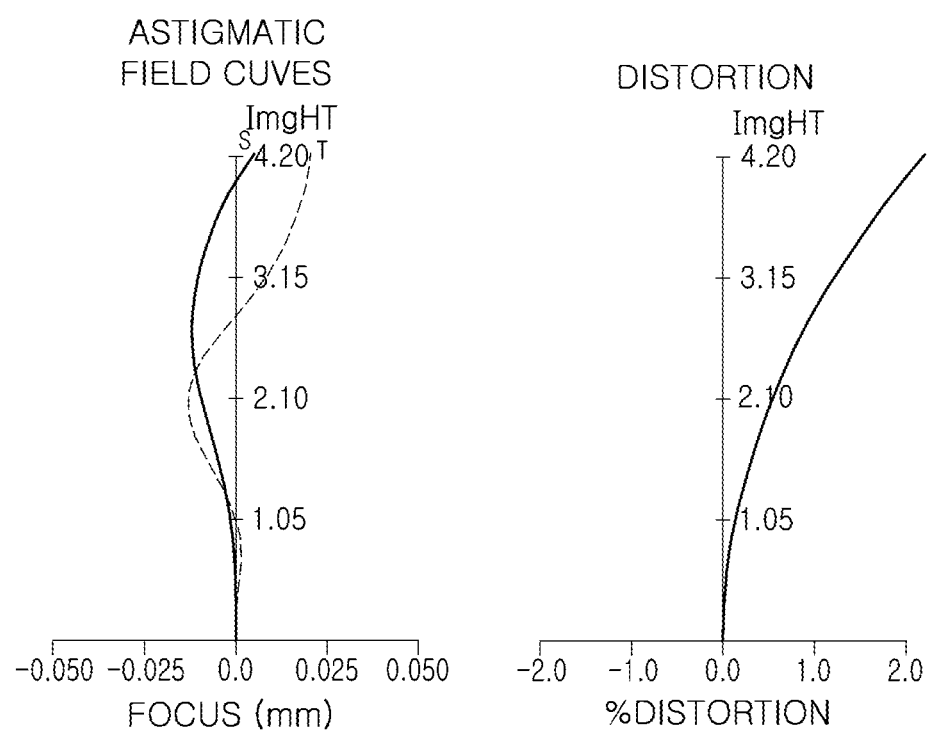
FIG. 10 is an aberration curve of the optical imaging system illustrated in FIG. 9.

Table 9 illustrates lens characteristics of the optical imaging system 500, and Table 10 illustrates aspherical values of the optical imaging system 500. FIG. 10 is an aberration curve of the above-configured optical imaging system 500.

TABLE 9

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 5.372 |
| S2 | | Infinity | 5.500 | 1.723 | 29.5 | 5.000 |
| S3 | | Infinity | 5.500 | 1.723 | 29.5 | 7.000 |
| S4 | | Infinity | 3.000 | | | 5.000 |
| S5 | First | 4.47 | 3.200 | 1.534 | 55.7 | 2.700 |
| S6 | Lens | −7.41 | 0.578 | | | 2.378 |
| S7 | Second | −2.85 | 0.533 | 1.615 | 26.0 | 2.192 |
| S8 | Lens | 125.72 | 0.400 | | | 2.010 |
| S9 | Third | 55.59 | 0.942 | 1.671 | 19.2 | 2.009 |
| S10 | Lens | −16.68 | 1.713 | | | 2.099 |
| S11 | Fourth | −9.42 | 1.415 | 1.635 | 24.0 | 2.000 |
| S12 | Lens | −5.33 | 0.171 | | | 2.307 |
| S13 | Fifth | −4.42 | 0.422 | 1.568 | 37.4 | 2.328 |
| S14 | Lens | −9.74 | 1.020 | | | 2.490 |
| S15 | Filter | Infinity | 0.110 | 1.519 | 64.2 | 2.740 |
| S16 | | Infinity | 7.496 | | | 2.754 |
| S17 | Imaging Plane | Infinity | 0.000 | | | 4.202 |

TABLE 10

| Aspherical Constant | S5 | S6 | S7 | S8 | S9 |
|---|---|---|---|---|---|
| K | −0.94399 | 0.00000 | 0.00000 | 0.00000 | 0.00000 |
| A | 0.16487 | 0.22316 | 1.03319 | 0.54973 | −0.45227 |
| B | −0.03170 | −0.02234 | −0.03289 | −0.14628 | −0.02671 |
| C | −0.00421 | 0.01010 | 0.04461 | 0.01317 | −0.01980 |
| D | 0.00772 | −0.00024 | 0.00515 | 0.00441 | 0.00223 |
| E | 0.00741 | 0.00138 | 0.00819 | 0.00282 | −0.00008 |
| F | 0.00406 | 0.00101 | 0.00317 | −0.00210 | 0.00115 |
| G | 0.00145 | 0.00090 | 0.00141 | 0.00048 | −0.00042 |
| H | 0.00029 | 0.00063 | 0.00060 | 0.00268 | −0.00005 |
| J | 0.00002 | 0.00014 | 0.00013 | 0.00078 | 0.00010 |

| Aspherical Constant | S10 | S11 | S12 | S13 | S14 |
|---|---|---|---|---|---|
| K | 0.00000 | 0.00000 | 0.00000 | 0.12131 | −1.46894 |
| A | −0.32026 | −0.60435 | −0.05772 | 0.54642 | −0.62099 |
| B | 0.03807 | 0.19736 | 0.08001 | −0.12226 | −0.07635 |
| C | 0.00806 | −0.02954 | −0.01694 | 0.11337 | 0.14267 |
| D | 0.00431 | 0.00951 | −0.02083 | −0.08315 | −0.04046 |
| E | −0.00031 | 0.01364 | 0.00406 | 0.03681 | 0.00332 |
| F | 0.00066 | −0.00573 | 0.00423 | −0.00091 | −0.00580 |
| G | 0.00041 | −0.00631 | 0.00251 | −0.00351 | −0.00264 |

TABLE 10-continued

| | | | | | |
|---|---|---|---|---|---|
| H | 0.00037 | −0.00034 | 0.00074 | −0.00155 | −0.00122 |
| J | 0.00015 | 0.00051 | 0.00019 | 0.00471 | 0.00154 |

Figure 11:
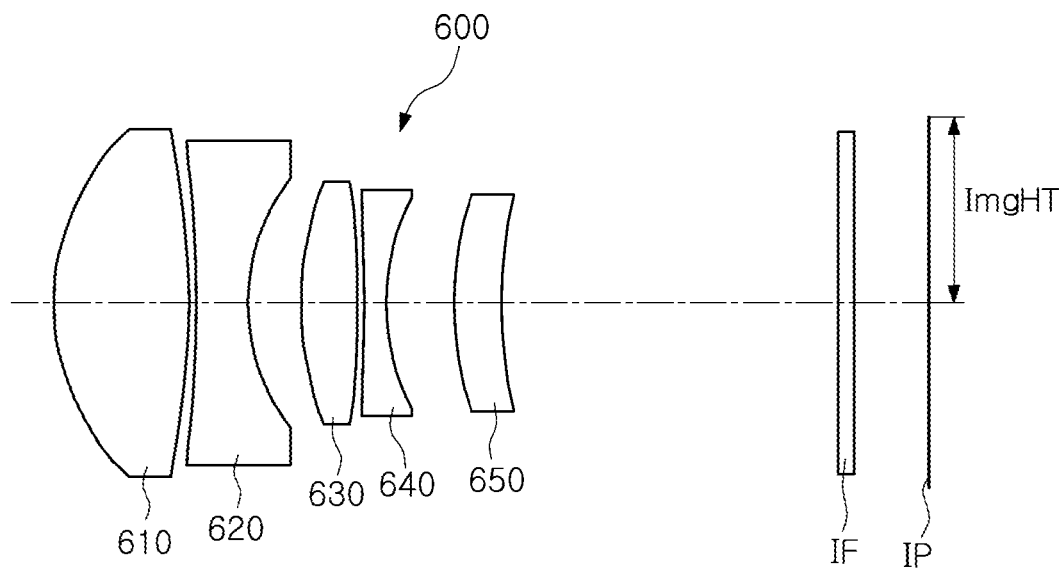
FIG. 11 illustrates a configuration of an optical imaging system according to a sixth example.

Hereinafter, an optical imaging system according to a sixth example will be described with reference to FIG. 11.

The optical imaging system 600 includes a first lens 610, a second lens 620, a third lens 630, a fourth lens 640, and a fifth lens 650.

The first lens 610 has positive refractive power. In the first lens 610, an object-side surface is convex and an image-side surface is convex. The second lens 620 has negative refractive power. In the second lens 620, an object-side surface is concave and an image-side surface is concave. The third lens 630 has positive refractive power. In the third lens 630, an object-side surface is convex and an image-side surface is convex. The fourth lens 640 has negative refractive power. In the fourth lens 640, an object-side surface is concave and an image-side surface is concave. The fifth lens 650 has positive refractive power. In the fifth lens 650, an object-side surface is convex and an image-side surface is concave.

The optical imaging system 600 includes a filter IF and an image sensor IP. The filter IF may be disposed in front of the image sensor IP to block infrared rays included in the incident light. The image sensor IP may include a plurality of optical sensors. The above-configured image sensor IP is configured to convert an optical signal into an electrical signal. The image sensor IP may form an imaging plane for imaging light incident through the first lens 610 to the fifth lens 650.

The optical imaging system 600 may include an optical path changing mechanism. For example, the optical imaging system 600 may include a prism reflecting or refracting incident light in a direction intersecting an optical path of the incident light.

Figure 12:
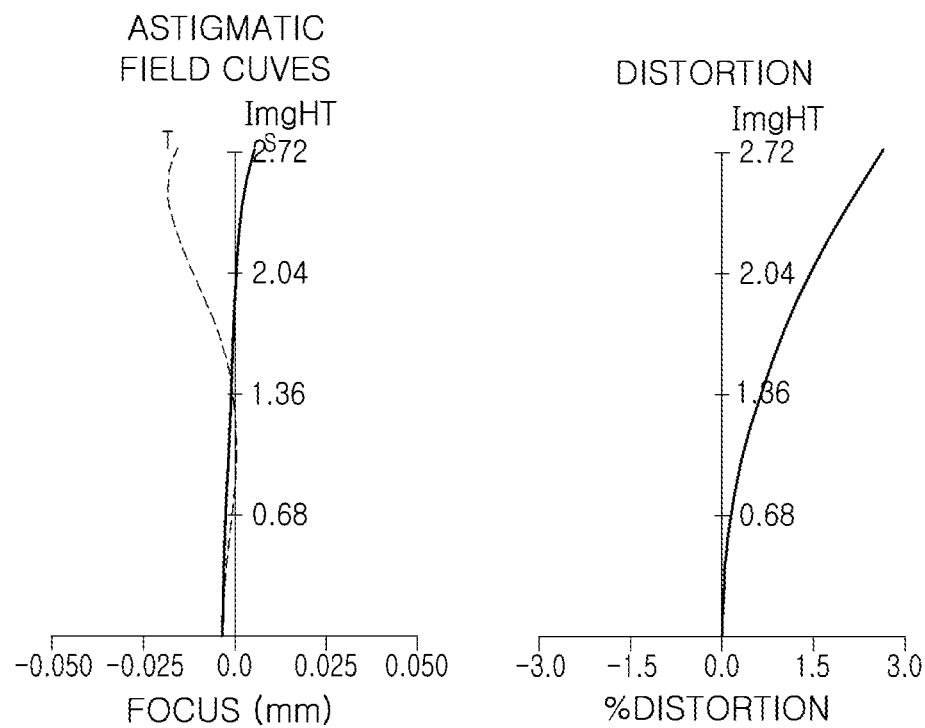
FIG. 12 is an aberration curve of the optical imaging system illustrated in FIG. 11.

Table 11 illustrates lens characteristics of the optical imaging system 600, and Table 12 illustrates aspherical values of the optical imaging system 600. FIG. 12 is an aberration curve of the above-configured optical imaging system 600.

TABLE 11

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 3.610 |
| S2 | | Infinity | 2.200 | 1.723 | 29.5 | 4.000 |
| S3 | | Infinity | 2.200 | 1.723 | 29.5 | 4.000 |
| S4 | | Infinity | 1.650 | | | 3.138 |
| S5 | First Lens | 3.50 | 1.996 | 1.547 | 56.1 | 2.550 |
| S6 | | −7.89 | 0.100 | | | 2.557 |
| S7 | Second | −33.58 | 0.774 | 1.621 | 26.0 | 2.380 |
| S8 | Lens | 2.73 | 0.796 | | | 1.846 |
| S9 | Third Lens | 4.75 | 0.828 | 1.679 | 19.2 | 1.792 |
| S10 | | −16.66 | 0.100 | | | 1.721 |
| S11 | Fourth | −77.49 | 0.325 | 1.621 | 26.0 | 1.670 |
| S12 | Lens | 3.00 | 1.010 | | | 1.548 |
| S13 | Fifth Lens | 4.07 | 0.710 | 1.547 | 56.1 | 1.600 |
| S14 | | 6.23 | 5.010 | | | 1.606 |
| S15 | Filter | Infinity | 0.210 | 1.519 | 64.2 | 2.487 |
| S16 | | Infinity | 1.136 | | | 2.512 |
| S17 | Imaging Plane | Infinity | 0.003 | | | 2.727 |

TABLE 12

| Aspherical Constant | S5 | S6 | S7 | S8 | S9 |
|---|---|---|---|---|---|
| K | −0.75263 | 0.00000 | 0.00000 | 0.00000 | 0.00000 |
| A | 0.00170 | 0.00288 | −0.00871 | −0.01357 | −0.01114 |
| B | 0.00017 | 0.00023 | 0.00242 | 0.00436 | 0.00581 |
| C | −0.00003 | 0.00002 | −0.00030 | −0.00125 | −0.00099 |
| D | 0.00001 | −0.00001 | 0.00001 | 0.00018 | −0.00008 |
| E | 0.00000 | 0.00000 | 0.00000 | −0.00001 | 0.00003 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

| Aspherical Constant | S10 | S11 | S12 | S13 | S14 |
|---|---|---|---|---|---|
| K | 0.00000 | 0.00000 | 0.00000 | 0.00000 | 0.00000 |
| A | −0.01105 | −0.00999 | −0.02439 | −0.02014 | −0.01075 |
| B | 0.00853 | 0.00081 | 0.00068 | 0.00151 | −0.00010 |
| C | −0.00188 | 0.00335 | 0.00439 | 0.00073 | 0.00092 |
| D | −0.00011 | −0.00138 | −0.00091 | 0.00029 | −0.00008 |
| E | 0.00005 | 0.00015 | 0.00002 | −0.00006 | 0.00003 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Figure 13:
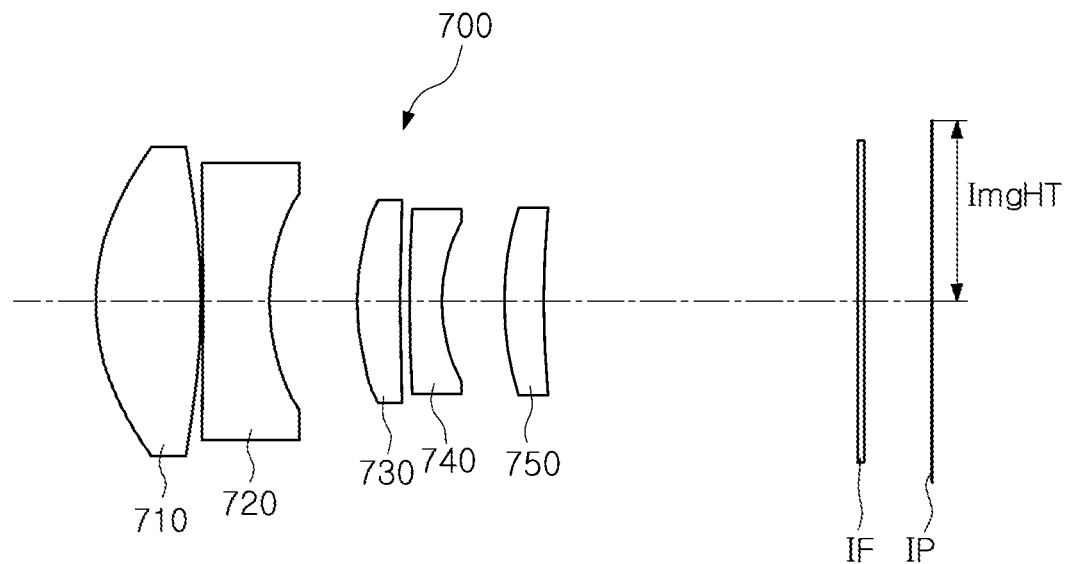
FIG. 13 illustrates a configuration of an optical imaging system according to a seventh example.

Hereinafter, an optical imaging system according to a seventh example will be described with reference to FIG. 13.

The optical imaging system 700 includes a first lens 710, a second lens 720, a third lens 730, a fourth lens 740, and a fifth lens 750.

The first lens 710 has positive refractive power. In the first lens 710, an object-side surface is convex and an image-side surface is convex. The second lens 720 has negative refractive power. In the second lens 720, an object-side surface is concave and an image-side surface is concave. The third lens 730 has positive refractive power. In the third lens 730, an object-side surface is convex and an image-side surface is concave. The fourth lens 740 has negative refractive power. In the fourth lens 740, an object-side surface is convex and an image-side surface is concave. The fifth lens 750 has positive refractive power. In the fifth lens 750, an object-side surface is convex and an image-side surface is concave.

The optical imaging system 700 includes a filter IF and an image sensor IP. The filter IF may be disposed in front of the image sensor IP to block infrared rays included in the incident light. The image sensor IP may include a plurality of optical sensors. The above-configured image sensor IP is configured to convert an optical signal into an electrical signal. The image sensor IP may form an imaging plane for imaging light incident through the first lenses 710 to the fifth lenses 750.

The optical imaging system 700 may include an optical path changing mechanism. For example, the optical imaging system 700 may include a prism reflecting or refracting incident light in a direction intersecting an optical path of the incident light.

Figure 14:
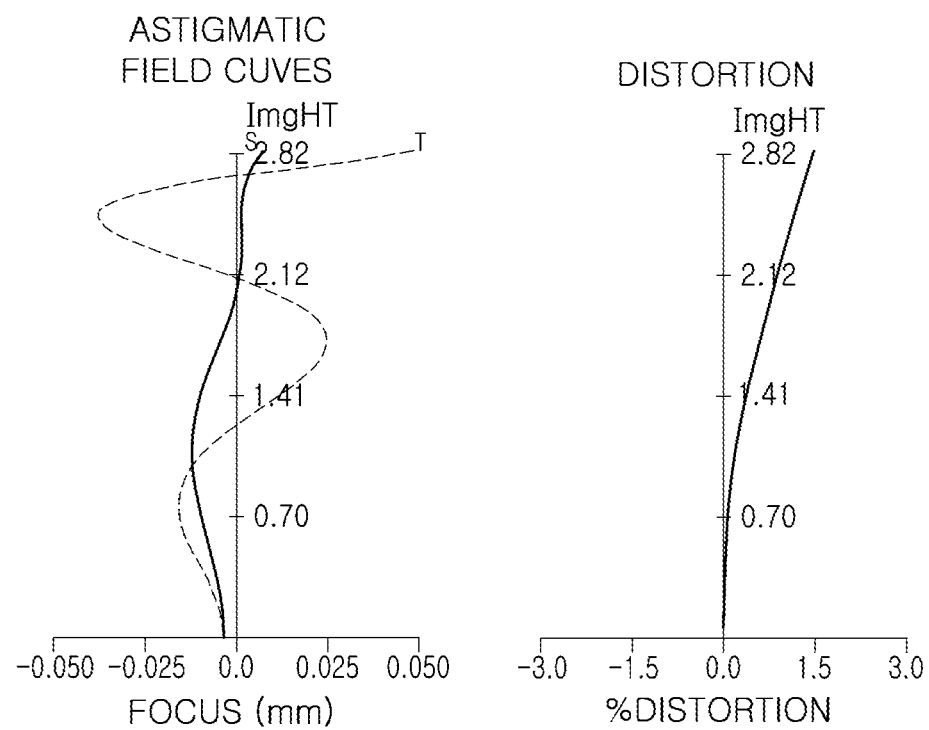
FIG. 14 is an aberration curve of the optical imaging system illustrated in FIG. 13.

Table 13 illustrates lens characteristics of the optical imaging system 700, and Table 14 illustrates aspherical values of the optical imaging system 700. FIG. 14 is an aberration curve of the above-configured optical imaging system 700.

TABLE 13

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 3.610 |
| S2 | | Infinity | 2.200 | 1.723 | 29.5 | 4.000 |
| S3 | | Infinity | 2.200 | 1.723 | 29.5 | 4.000 |
| S4 | | Infinity | 1.650 | | | 3.138 |
| S5 | First | 3.66 | 1.677 | 1.537 | 55.7 | 2.450 |
| S6 | Lens | −10.29 | 0.041 | | | 2.314 |
| S7 | Second | −75.50 | 1.044 | 1.621 | 26.0 | 2.201 |
| S8 | Lens | 3.30 | 1.400 | | | 1.757 |
| S9 | Third | 4.12 | 0.681 | 1.679 | 19.2 | 1.618 |
| S10 | Lens | 33.89 | 0.150 | | | 1.526 |
| S11 | Fourth | 27.09 | 0.507 | 1.621 | 26.0 | 1.467 |
| S12 | Lens | 2.70 | 1.017 | | | 1.281 |
| S13 | Fifth | 4.56 | 0.625 | 1.547 | 56.1 | 1.449 |
| S14 | Lens | 9.45 | 5.000 | | | 1.503 |
| S15 | Filter | Infinity | 0.110 | 1.519 | 64.2 | 2.553 |
| S16 | | Infinity | 1.095 | | | 2.569 |
| S17 | Imaging Plane | Infinity | 0.003 | | | 2.825 |

TABLE 14

| Aspherical Constant | S5 | S6 | S7 | S8 | S9 |
|---|---|---|---|---|---|
| K | −0.60081 | −1.82822 | −31.05488 | 0.28745 | 0.43315 |
| A | 0.00075 | 0.00147 | −0.00241 | −0.00477 | −0.00401 |
| B | 0.00004 | 0.00000 | 0.00041 | 0.00030 | 0.00062 |
| C | 0.00000 | 0.00000 | 0.00000 | −0.00003 | −0.00002 |
| D | 0.00000 | 0.00000 | 0.00000 | 0.00001 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

| Aspherical Constant | S10 | S11 | S12 | S13 | S14 |
|---|---|---|---|---|---|
| K | 5.67015 | 99.00000 | 0.23894 | −1.29539 | −57.51740 |
| A | −0.00582 | −0.00409 | −0.00760 | −0.01345 | −0.00510 |
| B | 0.00112 | 0.00026 | 0.00178 | 0.00168 | 0.00021 |
| C | 0.00006 | 0.00030 | 0.00056 | 0.00090 | −0.00035 |
| D | 0.00005 | −0.00001 | 0.00002 | −0.00011 | 0.00029 |
| E | 0.00001 | 0.00000 | −0.00011 | −0.00001 | 0.00000 |
| F | 0.00000 | −0.00001 | −0.00001 | 0.00001 | −0.00001 |
| G | 0.00000 | 0.00000 | 0.00000 | 0.00000 | 0.00001 |
| H | 0.00000 | 0.00000 | 0.00000 | 0.00000 | 0.00000 |
| J | 0.00000 | 0.00000 | 0.00000 | 0.00000 | 0.00000 |

Figure 15:
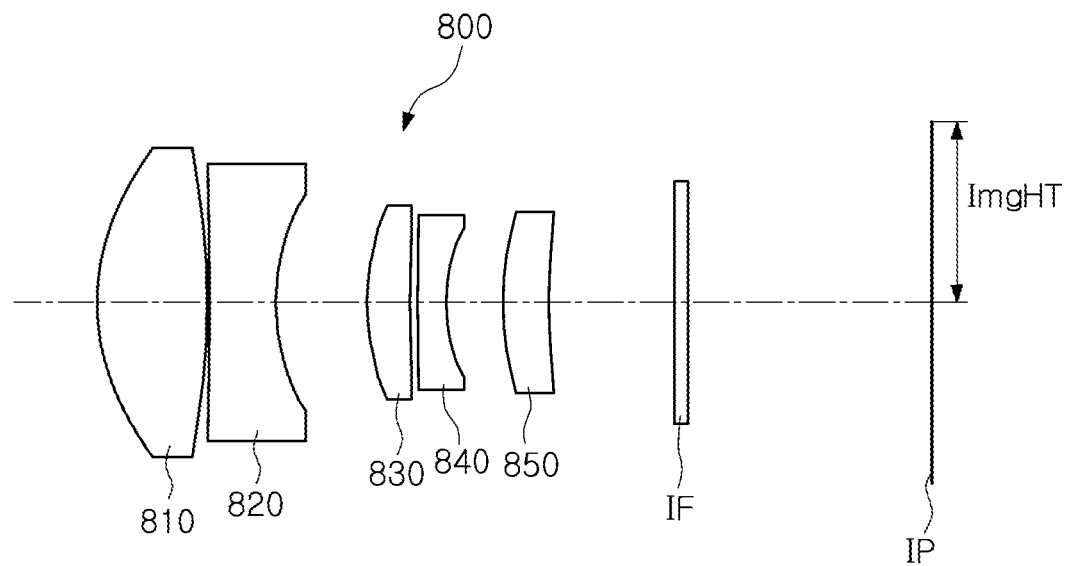
FIG. 15 is a configuration diagram of an optical imaging system according to an eighth example.

Hereinafter, an optical imaging system according to the eighth example will be described with reference to FIG. 15.

The optical imaging system 800 includes a first lens 810, a second lens 820, a third lens 830, a fourth lens 840, and a fifth lens 850.

The first lens 810 has positive refractive power. In the first lens 810, an object side convex and an image side convex. The second lens 820 has negative refractive power. In the second lens 820, an object-side surface is concave and an image-side surface is concave. The third lens 830 has positive refractive power. In the third lens 830, an object-side surface is convex and an image-side surface is concave. The fourth lens 840 has negative refractive power. In the fourth lens 840, an object-side surface is convex and an image-side surface is concave. The fifth lens 850 has positive refractive power. In the fifth lens 850, an object-side surface is convex and an image-side surface is concave.

The optical imaging system 800 includes a filter IF and an image sensor IP. The filter IF may be disposed in front of the image sensor IP to block infrared rays included in the incident light. The image sensor IP may include a plurality of optical sensors. The above-configured image sensor IP is configured to convert an optical signal into an electrical signal. The image sensor IP may form an imaging plane for imaging light incident through the first lens 810 to the fifth lens 850.

The optical imaging system 800 may include an optical path changing mechanism. For example, the optical imaging system 800 may include a prism reflecting or refracting incident light in a direction intersecting an optical path of the incident light.

Figure 16:
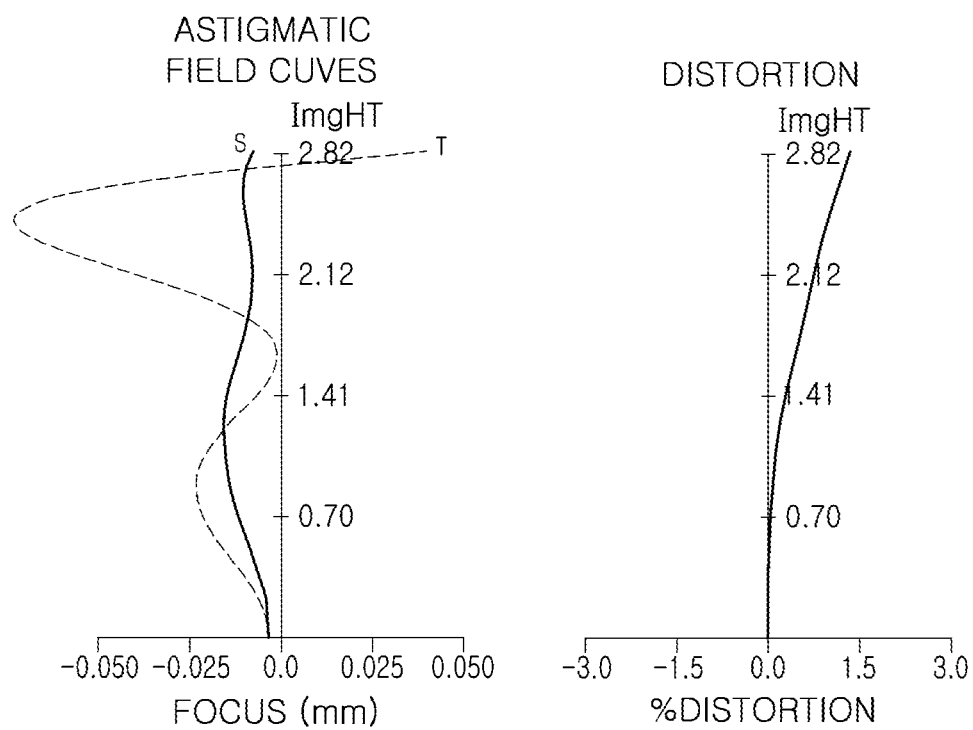
FIG. 16 is an aberration curve of the optical imaging system illustrated in FIG. 15.

Table 15 illustrates lens characteristics of the optical imaging system 800, and Table 16 illustrates aspherical values of the optical imaging system 800. FIG. 16 is an aberration curve of the above-configured optical imaging system 800.

TABLE 15

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 3.610 |
| S2 | | Infinity | 2.200 | 1.723 | 29.5 | 4.000 |
| S3 | | Infinity | 2.200 | 1.723 | 29.5 | 4.000 |
| S4 | | Infinity | 1.650 | | | 3.138 |
| S5 | First | 3.57 | 1.722 | 1.537 | 55.7 | 2.450 |
| S6 | Lens | −9.99 | 0.100 | | | 2.313 |
| S7 | Second | −44.97 | 1.029 | 1.621 | 26.0 | 2.166 |
| S8 | Lens | 3.23 | 1.416 | | | 1.705 |
| S9 | Third | 3.94 | 0.665 | 1.679 | 19.2 | 1.530 |
| S10 | Lens | 31.23 | 0.116 | | | 1.441 |
| S11 | Fourth | 27.71 | 0.448 | 1.621 | 26.0 | 1.395 |
| S12 | Lens | 2.64 | 0.903 | | | 1.220 |
| S13 | Fifth | 4.62 | 0.720 | 1.547 | 56.1 | 1.380 |
| S14 | Lens | 9.47 | 2.001 | | | 1.438 |
| S15 | Filter | Infinity | 0.210 | 1.519 | 64.2 | 1.887 |
| S16 | | Infinity | 3.851 | | | 1.919 |
| S17 | Imaging Plane | Infinity | 0.004 | | | 2.820 |

TABLE 16

| Aspherical Constant | S5 | S6 | S7 | S8 | S9 |
|---|---|---|---|---|---|
| K | −0.61007 | −1.44237 | −99.00000 | 0.28690 | 0.46067 |
| A | 0.00082 | 0.00165 | −0.00275 | −0.00554 | −0.00457 |
| B | 0.00005 | −0.00001 | 0.00053 | 0.00038 | 0.00082 |
| C | 0.00000 | 0.00000 | 0.00000 | −0.00002 | −0.00003 |
| D | 0.00000 | 0.00000 | 0.00000 | 0.00002 | 0.00000 |
| E | 0.00000 | 0.00000 | 0.00000 | 0.00000 | 0.00000 |
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

| Aspherical Constant | S10 | S11 | S12 | S13 | S14 |
|---|---|---|---|---|---|
| K | −10.57142 | 96.19935 | 0.28336 | −0.87741 | −60.82116 |
| A | −0.00681 | −0.00515 | −0.00841 | −0.01496 | −0.00593 |
| B | 0.00136 | 0.00012 | 0.00270 | 0.00238 | 0.00055 |
| C | 0.00004 | 0.00036 | 0.00099 | 0.00154 | −0.00035 |
| D | 0.00006 | −0.00002 | 0.00014 | 0.00000 | 0.00048 |
| E | 0.00001 | 0.00001 | −0.00014 | 0.00001 | 0.00002 |
| F | −0.00001 | −0.00001 | 0.00000 | 0.00000 | −0.00002 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Figure 17:
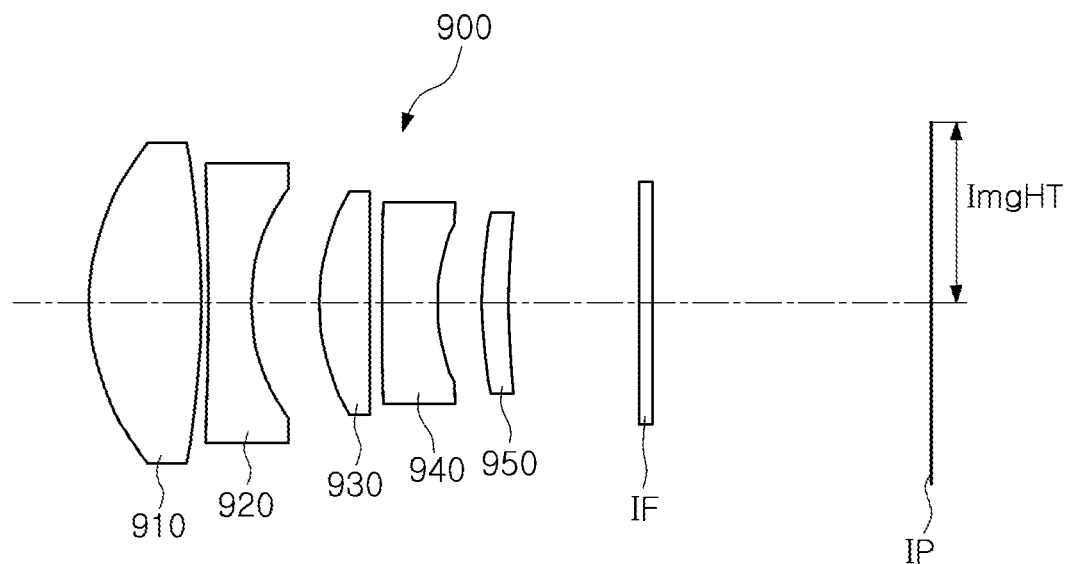
FIG. 17 illustrates a configuration of an optical imaging system according to a ninth example.

Hereinafter, an optical imaging system according to the ninth example will be described with reference to FIG. 17.

The optical imaging system 900 includes a first lens 910, a second lens 920, a third lens 930, a fourth lens 940, and a fifth lens 950.

The first lens 910 has positive refractive power. In the first lens 910, an object-side surface is convex and an image-side surface is convex. The second lens 920 has negative refractive power. In the second lens 920, an object-side surface is concave and an image-side surface is concave. The third lens 930 has positive refractive power. In the third lens 930, an object-side surface is convex and an image-side surface is concave. The fourth lens 940 has negative refractive power. In the fourth lens 940, an object-side surface is convex and an image-side surface is concave. The fifth lens 950 has positive refractive power. In the fifth lens 950, an object-side surface is convex and an image-side surface is concave.

The optical imaging system 900 includes a filter IF and an image sensor IP. The filter IF may be disposed in front of the image sensor IP to block infrared rays included in the incident light. The image sensor IP may include a plurality of optical sensors. The above-configured image sensor IP is configured to convert an optical signal into an electrical signal. The image sensor IP may form an imaging plane for imaging light incident through the first lens 910 to the fifth lens 950.

The optical imaging system 900 may include an optical path converting mechanism. For example, the optical imaging system 900 may include a prism reflecting or refracting incident light in a direction intersecting an optical path of the incident light.

Figure 18:
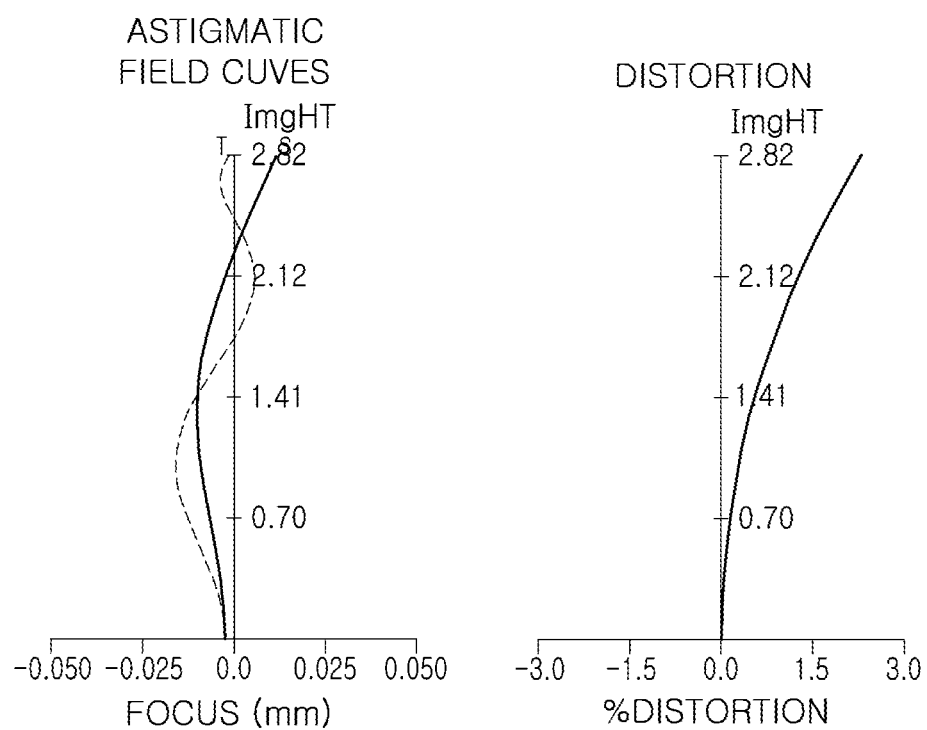
FIG. 18 is an aberration curve of the optical imaging system illustrated in FIG. 17.

Table 17 illustrates lens characteristics of the optical imaging system 900, and Table 18 illustrates aspherical values of the optical imaging system 900. FIG. 18 is an aberration curve of the above-configured optical imaging system 900.

TABLE 17

| Surface No. | Remark | Radius of Curvature | Thickness/ Distance | Refractive Index | Abbe Number | Effective Radius |
|---|---|---|---|---|---|---|
| S1 | Prism | Infinity | 0.000 | | | 3.610 |
| S2 | | Infinity | 2.200 | 1.723 | 29.5 | 4.000 |
| S3 | | Infinity | 2.200 | 1.723 | 29.5 | 4.000 |
| S4 | | Infinity | 1.650 | | | 3.138 |
| S5 | First Lens | 3.57 | 1.764 | 1.537 | 55.7 | 2.450 |
| S6 | | −10.41 | 0.109 | | | 2.292 |
| S7 | Second | −49.07 | 0.662 | 1.646 | 23.5 | 2.137 |
| S8 | Lens | 2.94 | 1.053 | | | 1.754 |
| S9 | Third Lens | 3.42 | 0.775 | 1.679 | 19.2 | 1.705 |
| S10 | | 73.66 | 0.188 | | | 1.621 |
| S11 | Fourth | 43.58 | 0.869 | 1.646 | 23.5 | 1.531 |
| S12 | Lens | 2.96 | 0.704 | | | 1.220 |
| S13 | Fifth Lens | 6.34 | 0.416 | 1.537 | 55.7 | 1.380 |
| S14 | | 10.77 | 2.001 | | | 1.382 |
| S15 | Filter | Infinity | 0.210 | 1.519 | 64.2 | 1.815 |
| S16 | | Infinity | 4.345 | | | 1.845 |
| S17 | Imaging Plane | Infinity | 0.003 | | | 2.822 |

TABLE 18

| Aspherical Constant | S5 | S6 | S7 | S8 | S9 |
|---|---|---|---|---|---|
| K | −0.60618 | −1.21584 | −99.00000 | 0.28176 | 0.46564 |
| A | 0.00083 | 0.00163 | −0.00274 | −0.00563 | −0.00452 |
| B | 0.00005 | −0.00001 | 0.00053 | 0.00041 | 0.00079 |
| C | 0.00000 | 0.00000 | 0.00000 | −0.00003 | −0.00002 |
| D | 0.00000 | 0.00000 | 0.00000 | 0.00001 | 0.00000 |
| E | 0.00000 | 0.00000 | 0.00000 | 0.00000 | 0.00000 |

TABLE 18-continued

| | | | | | |
|---|---|---|---|---|---|
| F | 0.00000 | 0.00000 | 0.00000 | 0.00000 | 0.00000 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

| Aspherical Constant | S10 | S11 | S12 | S13 | S14 |
|---|---|---|---|---|---|
| K | 22.60935 | 96.09024 | 0.30520 | −1.50913 | −53.32311 |
| A | −0.00675 | −0.00523 | −0.00799 | −0.01552 | −0.00524 |
| B | 0.00135 | 0.00017 | 0.00253 | 0.00268 | 0.00136 |
| C | 0.00001 | 0.00040 | 0.00079 | 0.00176 | 0.00011 |
| D | 0.00006 | −0.00001 | 0.00024 | 0.00000 | 0.00034 |
| E | 0.00001 | 0.00001 | −0.00014 | 0.00001 | 0.00002 |
| F | −0.00001 | −0.00001 | 0.00000 | 0.00000 | −0.00002 |
| G | 0.00000 | 0.00000 | 0.00000 | 0.00000 | 0.00000 |
| H | 0.00000 | 0.00000 | 0.00000 | 0.00000 | 0.00000 |
| J | 0.00000 | 0.00000 | 0.00000 | 0.00000 | 0.00000 |

Table 19 illustrates optical characteristics of the optical imaging systems according to the first to ninth examples.

TABLE 19

| Remark | First Example | Second Example | Third Example | Fourth Example | Fifth Example |
|---|---|---|---|---|---|
| f | 19.000 | 19.000 | 19.000 | 19.000 | 19.000 |
| f1 | 6.798 | 7.297 | 6.225 | 6.380 | 5.735 |
| f2 | −6.211 | −6.117 | −5.051 | −4.571 | −4.490 |
| f3 | 8.817 | 6.510 | 12.289 | 7.865 | 18.979 |
| f4 | −6.889 | −6.091 | −27.587 | −18.532 | 16.836 |
| f5 | 21.254 | 25.893 | 201.798 | −1335.159 | −14.560 |
| TTL | 18.000 | 18.000 | 18.000 | 18.000 | 18.000 |
| BFL | 8.992 | 9.741 | 8.920 | 8.824 | 8.627 |
| f number | 3.26 | 2.35 | 3.27 | 3.16 | 3.51 |
| ImgHT | 4.2 | 4.2 | 4.2 | 4.2 | 4.2 |

| Remark | Sixth Example | Seventh Example | Eighth Example | Ninth Example |
|---|---|---|---|---|
| f | 14.198 | 14.200 | 14.200 | 14.200 |
| f1 | 4.729 | 5.257 | 5.130 | 5.179 |
| f2 | −4.042 | −5.063 | −4.811 | −4.273 |
| f3 | 5.534 | 6.845 | 6.573 | 5.266 |
| f4 | −4.648 | −4.878 | −4.736 | −4.965 |
| f5 | 19.278 | 15.428 | 15.710 | 27.784 |
| TTL | 12.999 | 13.350 | 13.185 | 13.096 |
| BFL | 6.360 | 6.208 | 6.066 | 6.558 |
| f number | 2.61 | 2.89 | 2.89 | 2.93 |
| ImgHT | 2.72 | 2.82 | 2.82 | 2.82 |

Table 20 and Table 21 show values of conditional expressions of the optical imaging systems according to the first to ninth examples. As can be seen from Table 20 and Table 21, the optical imaging systems according to the first to ninth examples satisfy all of the above-mentioned conditional expressions.

TABLE 20

| Conditional Expression | First Example | Second Example | Third Example | Fourth Example | Fifth Example |
|---|---|---|---|---|---|
| f number | 3.2600 | 2.3500 | 3.2700 | 3.1600 | 3.5100 |
| n2 + n3 | 3.2858 | 3.3099 | 3.2858 | 3.3057 | 3.2858 |
| \|f1 + f2\| | 0.5874 | 1.1793 | 1.1744 | 1.8088 | 1.2443 |
| \|f/f1 + f/f2\| | 0.2643 | 0.5020 | 0.7097 | 1.1783 | 0.9181 |
| D12/f | 0.0053 | 0.0053 | 0.0059 | 0.0084 | 0.0304 |
| EL1S1/ImgHT | 1.4119 | 1.4119 | 1.3810 | 1.4286 | 1.2857 |
| EL1S2/EL1S1 | 0.9365 | 0.9028 | 0.9199 | 0.9534 | 0.8806 |
| TTL/f | 0.9474 | 0.9474 | 0.9474 | 0.9474 | 0.9474 |
| TTL/ImgHT | 4.2857 | 4.2857 | 4.2857 | 4.2857 | 4.2857 |
| R1/f | 0.2621 | 0.2608 | 0.2427 | 0.2467 | 0.2352 |
| T1/TTL | 0.1178 | 0.1301 | 0.1232 | 0.1037 | 0.1778 |

| Conditional Expression | Sixth Example | Seventh Example | Eighth Example | Ninth Example |
|---|---|---|---|---|
| f number | 2.6100 | 2.8900 | 2.8900 | 2.9300 |
| n2 + n3 | 3.2995 | 3.2995 | 3.2995 | 3.3244 |
| \|f1 + f2\| | 0.6874 | 0.1943 | 0.3193 | 0.9057 |
| \|f/f1 + f/f2\| | 0.5106 | 0.1036 | 0.1837 | 0.5812 |
| D12/f | 0.0070 | 0.0029 | 0.0070 | 0.0077 |
| EL1S1/ImgHT | 1.8750 | 1.7376 | 1.7376 | 1.7376 |
| EL1S2/EL1S1 | 1.0027 | 0.9447 | 0.9441 | 0.9355 |
| TTL/f | 0.9156 | 0.9401 | 0.9285 | 0.9223 |
| TTL/ImgHT | 4.7790 | 4.7341 | 4.6756 | 4.6441 |
| R1/f | 0.2465 | 0.2581 | 0.2515 | 0.2512 |
| T1/TTL | 0.1536 | 0.1256 | 0.1306 | 0.1347 |

TABLE 21

| Conditional Expression | First Example | Second Example | Third Example | Fourth Example | Fifth Example |
|---|---|---|---|---|---|
| BFL/f | 0.4733 | 0.5127 | 0.4695 | 0.4644 | 0.4540 |
| BFL/TTL | 0.4996 | 0.5412 | 0.4955 | 0.4902 | 0.4793 |
| BFL/ImgHT | 2.1409 | 2.3194 | 2.1237 | 2.1009 | 2.0540 |
| f/ImgHT | 2.1409 | 2.3194 | 2.1237 | 2.1009 | 2.0540 |
| (D23 + D45)/BFL | 0.3277 | 0.2535 | 0.4154 | 0.4107 | 0.0661 |
| D23/BFL | 0.1604 | 0.1275 | 0.0998 | 0.0891 | 0.0464 |
| D45/BFL | 0.1674 | 0.1260 | 0.3156 | 0.3216 | 0.0198 |
| (D23 + D34 + D45)/BFL | 0.3388 | 0.2638 | 0.4266 | 0.4246 | 0.2647 |
| (L1S1:L5S2)/BFL | 1.0018 | 0.8478 | 1.0180 | 1.0399 | 1.0866 |
| (n2 + n4)/n3 | 1.9333 | 1.9622 | 1.9333 | 1.9786 | 1.9452 |
| (V2 + V4)/V3 | 2.6988 | 2.4448 | 2.6988 | 2.2460 | 2.5954 |

| Conditional Expression | Sixth Example | Seventh Example | Eighth Example | Ninth Example |
|---|---|---|---|---|
| BFL/f | 0.4480 | 0.4372 | 0.4272 | 0.4618 |
| BFL/TTL | 0.4893 | 0.4650 | 0.4600 | 0.5008 |
| BFL/ImgHT | 2.3382 | 2.2013 | 2.1510 | 2.3256 |
| f/ImgHT | 2.3382 | 2.2013 | 2.1510 | 2.3256 |
| (D23 + D45)/BFL | 0.2839 | 0.3894 | 0.3823 | 0.2679 |
| D23/BFL | 0.1251 | 0.2255 | 0.2334 | 0.1605 |
| D45/BFL | 0.1588 | 0.1639 | 0.1488 | 0.1074 |
| (D23 + D34 + D45)/BFL | 0.2996 | 0.4136 | 0.4014 | 0.2965 |
| (L1S1:L5S2)/BFL | 1.0438 | 1.1505 | 1.1737 | 0.9970 |
| (n2 + n4)/n3 | 1.9306 | 1.9306 | 1.9306 | 1.9603 |
| (V2 + V4)/V3 | 2.6988 | 2.6988 | 2.6988 | 2.4448 |

Hereinafter, modified examples of an optical imaging system will be described with reference to FIGS. 19 and 20.

Figure 19:
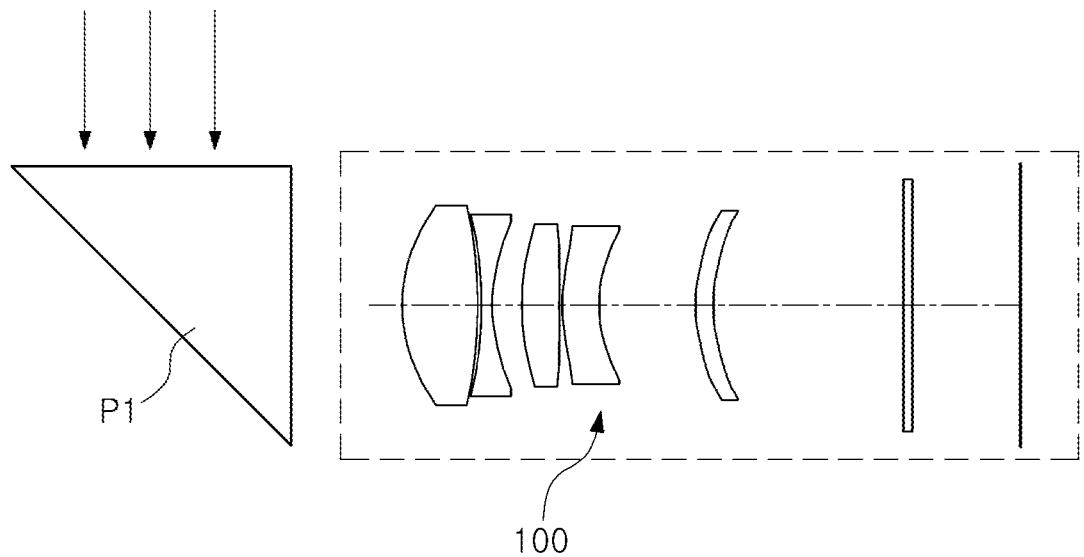
FIGS. 19 and 20 are modified examples of an optical imaging system.
Figure 20:
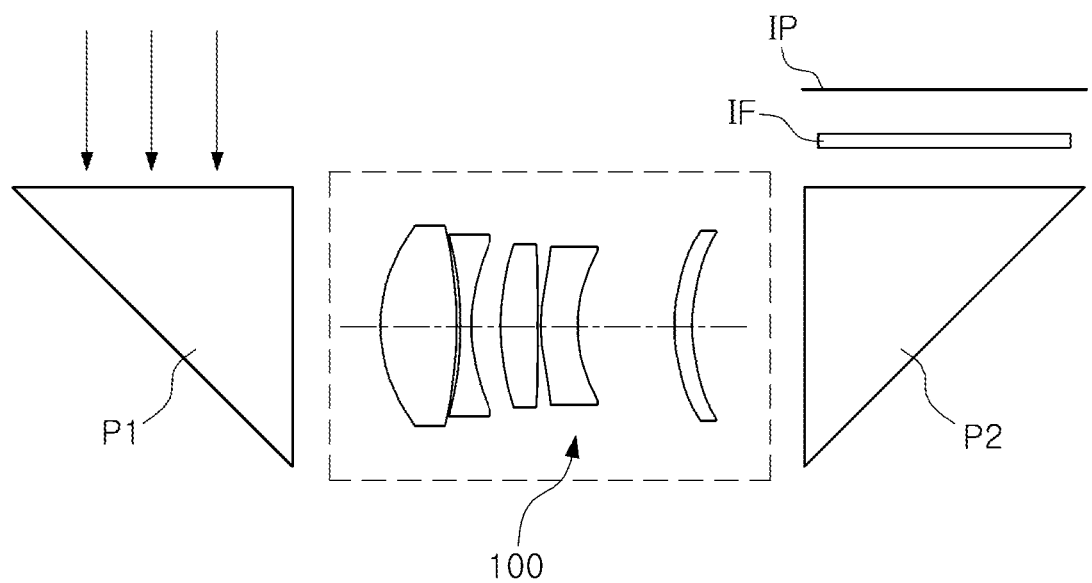

The above-described optical imaging systems according to the first to ninth examples may be configured in the form illustrated in FIG. 19 or FIG. 20. For example, the optical imaging system 100 according to the first examples includes one prism P1, as illustrated in FIG. 19, or two prisms P1 and P2, as illustrated in FIG. 20.

Since the former form allows the optical imaging system 100 to be disposed in a width direction of the portable terminal device, a distance TTL from an object-side surface of a first lens to an imaging plane of the first lens may be sufficiently secured. Since the latter form may sufficiently secure a distance BFL from an image-side surface of a fifth lens to an imaging plane of an image sensor, it may be advantageous to implement an optical imaging system having a relatively long BFL.

Figure 21:
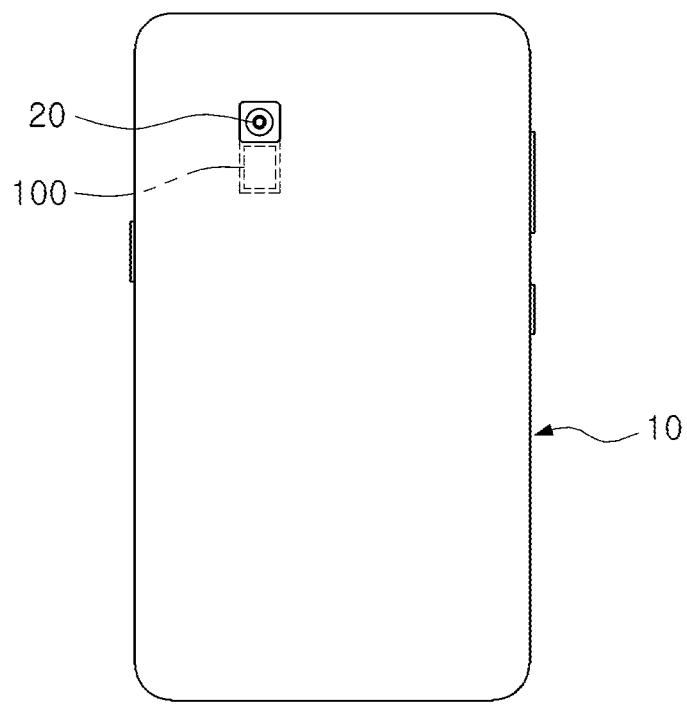
FIGS. 21 and 22 are rear views of portable terminal devices, each having an optical imaging system according to an example.
Figure 22:
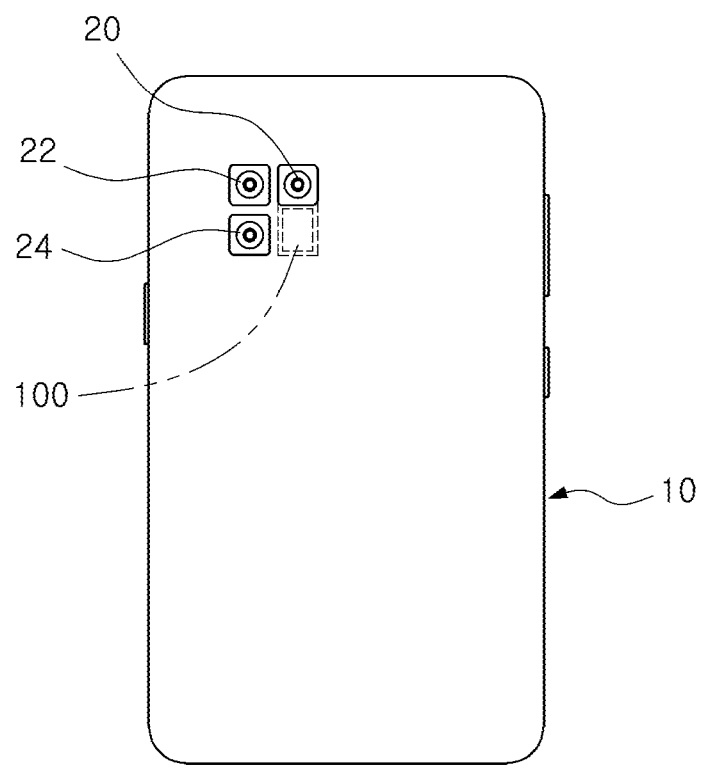

Next, portable terminal devices, each having an optical imaging system according to an example of the present disclosure, will be described with reference to FIGS. 21 and 22.

The above-described optical imaging systems according to the first to ninth examples and the optical imaging systems configured in the forms illustrated in FIGS. 19 and 20 may be mounted in a camera module for a portable terminal device. As an example, the optical imaging system 100 according to the first example may be mounted in a rear camera module 20 of a portable terminal device 10. As another example, the optical imaging system 100 according to the first example may be mounted in one or more of a plurality of camera modules 20, 22 and 24 mounted in the portable terminal device 10.

As described above, an optical imaging system, which may be mounted in a thinned small-sized terminal device while having a large focal length, may be implemented.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens having a concave object-side surface, a third lens having positive refractive power, a fourth lens, and a fifth lens having positive refractive power disposed in order from an object side,
wherein $0.2 < (D23+D34+D45)/BFL < 0.95$, and
wherein $0.8 < TTL/f < 0.95$,
wherein $0.40 < BFL/f$, and
wherein $2.4 < (V2+V4)/V3$,
where D23 is a distance from an image-side surface of the second lens to an object-side surface of the third lens, D34 is a distance from an image-side surface of the third lens to an object-side surface of the fourth lens, D45 is a distance from an image-side surface of the fourth lens to an object-side surface of the fifth lens, BFL is a distance from an image-side surface of the fifth lens to an imaging plane, TTL is a distance from an object-side surface of the first lens to the imaging plane, f is a focal length of the optical imaging system, V2 is an Abbe number of the second lens, V3 is an Abbe number of the third lens, and V4 is an Abbe number of the fourth lens.

2. The optical imaging system of claim 1, wherein the second lens has negative refractive power.

3. The optical imaging system of claim 1, wherein a sum of a refractive index of the second lens and a refractive index of the third lens is greater than 3.20.

4. The optical imaging system of claim 1, wherein an absolute value of a sum of a focal length of the first lens and a focal length of the second lens is less than 2.0.

5. The optical imaging system of claim 1, wherein $|f/f1+f/f2|<1.2$, where f1 is a focal length of the first lens and f2 is a focal length of the second lens.

6. The optical imaging system of claim 1, wherein $0 \le D12/f \le 0.07$, where D12 is a distance from an image-side surface of the first lens to an object-side surface of the second lens.

7. The optical imaging system of claim 1, wherein $0.62 \le EL1S1/ImgHT \le 0.94$, where EL1S1 is an effective radius of the object-side surface of the first lens and ImgHT is a height of the imaging plane.

8. The optical imaging system of claim 1, wherein $0.8 \le EL1S2/EL1S1 \le 1.01$, where EL1S1 is an effective radius of the object-side surface of the first lens and EL1S2 is an effective radius of an image-side surface of the first lens.

9. The optical imaging system of claim 1, wherein $3.5 \le TTL/ImgHT$, where ImgHT is a height of the imaging plane.

10. The optical imaging system of claim 1, wherein $R1/f \le 0.265$, where R1 is a radius of curvature of the object-side surface of the first lens.

11. An optical imaging system comprising:
a first lens, a second lens, a third lens, a fourth lens having a concave image-side surface, and a fifth lens having positive refractive power disposed in order from an object side,
wherein $0.08 < T1/TTL < 0.18$,
wherein $0.40 < BFL/f$, and $2.4 < (V2+V4)/V3$, where T1 is a thickness in a center of an optical axis of the first lens and TTL is a length from an object-side surface of the first lens to an imaging plane, BFL is a distance from an image-side surface of the fifth lens to the imaging plane, f is a focal length of the optical imaging system, V2 is an Abbe number of the second lens, V3 is an Abbe number of the third lens, and V4 is an Abbe number of the fourth lens.

12. The optical imaging system of claim 11, wherein an image-side surface of the third lens is concave.

13. The optical imaging system of claim 11, wherein an object-side surface of the fourth lens is convex.

14. The optical imaging system of claim 11, wherein an image-side surface of the fourth lens is concave.

15. The optical imaging system of claim 11, wherein an object-side surface of the fifth lens is convex.

16. An optical imaging system comprising:
a first lens, a second lens having a concave object-side surface, a third lens having positive refractive power, a fourth lens, and a fifth lens having positive refractive power disposed in order from an object side,
wherein $0.8 < TTL/f < 0.95$, wherein 3.5≤TTL/ImgHT, and
wherein 2.4<(V2+V4)/V3,
where TTL is a distance from an object-side surface of the first lens to an imaging plane, f is a focal length of the optical imaging system, Img HT is a height of the imaging plane, V2 is an Abbe number of the second lens, V3 is an Abbe number of the third lens, and V4 is an Abbe number of the fourth lens.

17. The optical imaging system of claim 16, wherein 0.2<(D23+D34+D45)/BFL<0.95, where D23 is a distance from an image-side surface of the second lens to an object-side surface of the third lens, D34 is a distance from an image-side surface of the third lens to an object-side surface of the fourth lens, D45 is a distance from an image-side surface of the fourth lens to an object-side surface of the fifth lens, BFL is a distance from an image-side surface of the fifth lens to the imaging plane.

\* \* \* \* \*